US011230040B2

(12) United States Patent
Schad et al.

(10) Patent No.: US 11,230,040 B2
(45) Date of Patent: Jan. 25, 2022

(54) PLATEN WITH INTEGRATED ROTARY PLATE

(71) Applicant: Niigon Machines Ltd., Vaughan (CA)

(72) Inventors: Robert D. Schad, Toronto (CA); Carsten Link, Burlington (CA); Hemant Kumar, Brampton (CA)

(73) Assignee: Niigon Machines Ltd., Vaughan (CA)

( * ) Notice: Subject to any disclaimer, the term of this patent is extended or adjusted under 35 U.S.C. 154(b) by 1147 days.

(21) Appl. No.: 15/458,208

(22) Filed: Mar. 14, 2017

(65) Prior Publication Data
US 2017/0182690 A1    Jun. 29, 2017

Related U.S. Application Data

(63) Continuation of application No. PCT/CA2015/050895, filed on Sep. 15, 2015.

(60) Provisional application No. 62/050,472, filed on Sep. 15, 2014.

(51) Int. Cl.
*B29C 45/17* (2006.01)
*B29C 45/16* (2006.01)
*B29C 45/04* (2006.01)

(52) U.S. Cl.
CPC ...... *B29C 45/1744* (2013.01); *B29C 45/0441* (2013.01); *B29C 45/1615* (2013.01)

(58) Field of Classification Search
CPC ......... B29C 45/06; B29C 45/17; B29C 45/04; B29C 45/1744; B29C 33/22
See application file for complete search history.

(56) References Cited

U.S. PATENT DOCUMENTS

| | | | |
|---|---|---|---|
| 6,402,504 B1 | 6/2002 | Hahn | |
| 7,220,118 B2 | 5/2007 | Nishizawa et al. | |
| 8,066,507 B2 | 11/2011 | Suzumura | |
| 2002/0081350 A1* | 6/2002 | Elder | B29C 45/06 425/576 |
| 2004/0091570 A1* | 5/2004 | Wohlrab | B29C 45/68 425/589 |
| 2007/0218161 A1* | 9/2007 | Nagano | B29C 45/062 425/451.9 |
| 2009/0011072 A1* | 1/2009 | Glaesener | B29C 45/6728 425/595 |
| 2013/0122137 A1 | 5/2013 | Clark | |
| 2014/0023742 A1* | 1/2014 | Wang | B29C 45/162 425/130 |

FOREIGN PATENT DOCUMENTS

| | | | | |
|---|---|---|---|---|
| CN | 102806629 B | 9/2015 | | |
| JP | 2012 35533 | * | 2/2012 | ............. B29C 33/44 |
| JP | 5356201 B2 | 12/2013 | | |

* cited by examiner

*Primary Examiner* — Matthew J Daniels
*Assistant Examiner* — Shibin Liang
(74) *Attorney, Agent, or Firm* — Bereskin & Parr LLP/S.E.N.C.R.L, s.r.l.

(57) ABSTRACT

A platen apparatus for supporting a mold portion in an injection molding machine includes a platen body and a mold mounting face adjacent a front of the platen body for supporting a mold half. The mold mounting face includes a rotary central surface that is rotatable about an axis relative to the platen body and a fixed peripheral surface that is fixed relative to the platen body. The peripheral surface is disposed about a periphery of the central surface. The central surface and the peripheral surface are alignable in a common vertical plane.

32 Claims, 14 Drawing Sheets

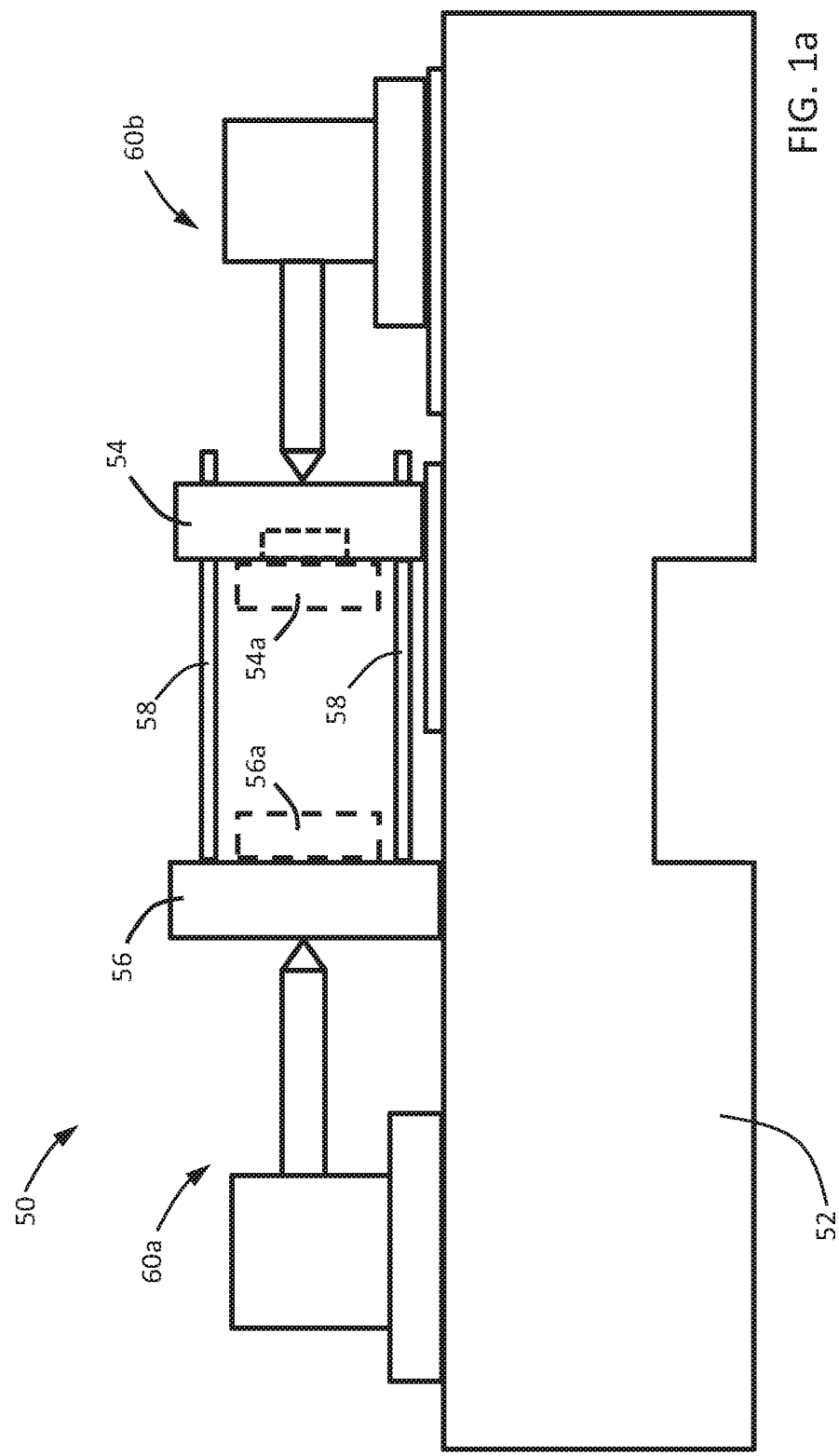

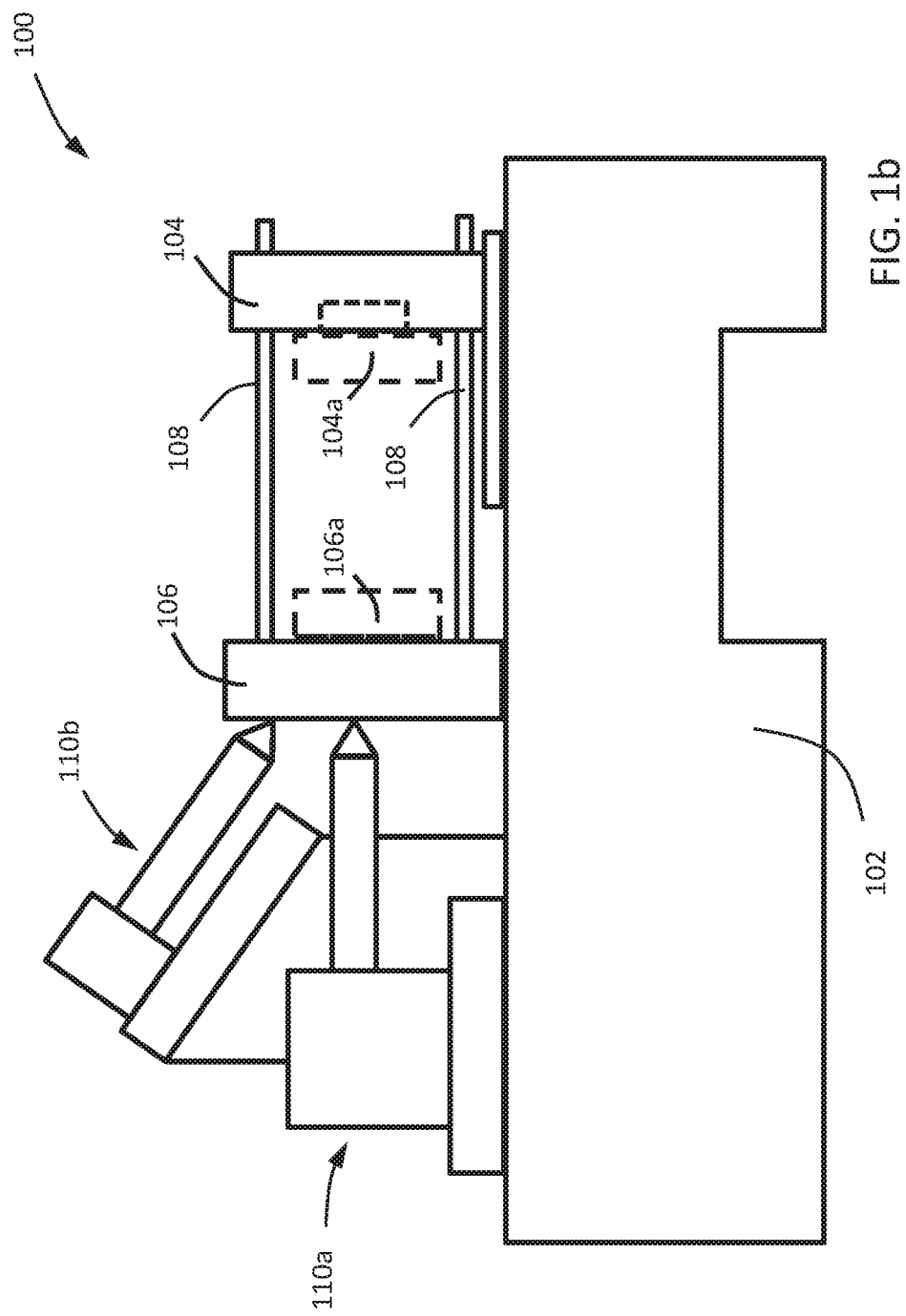

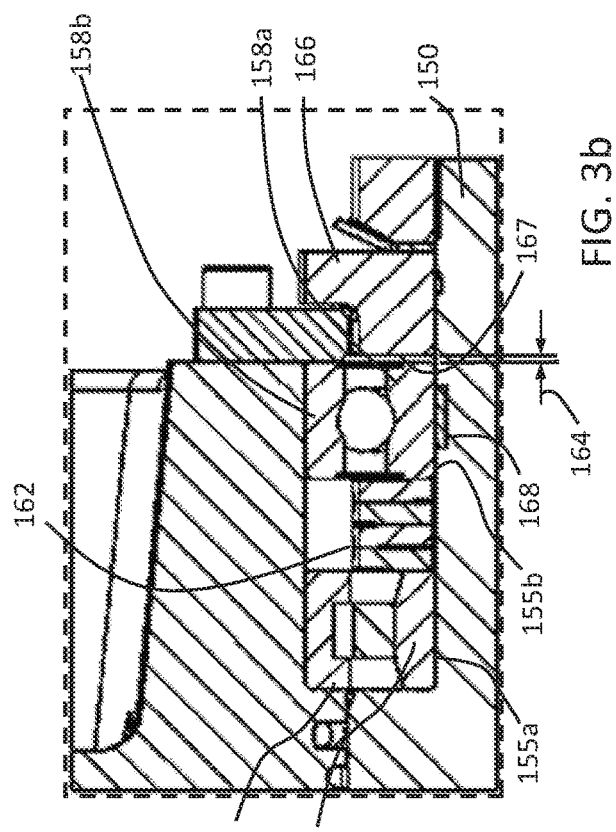
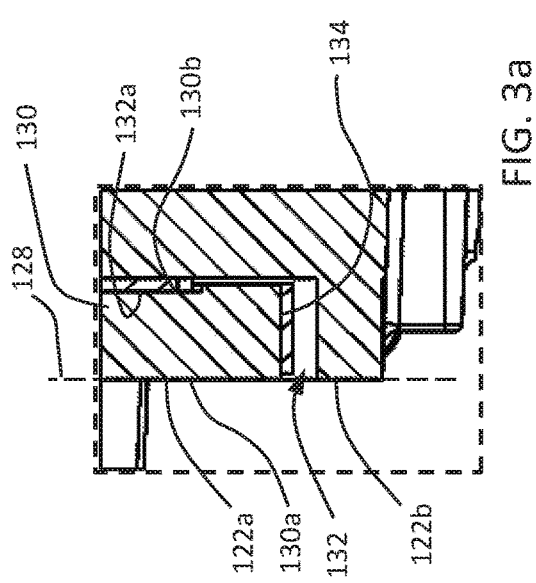
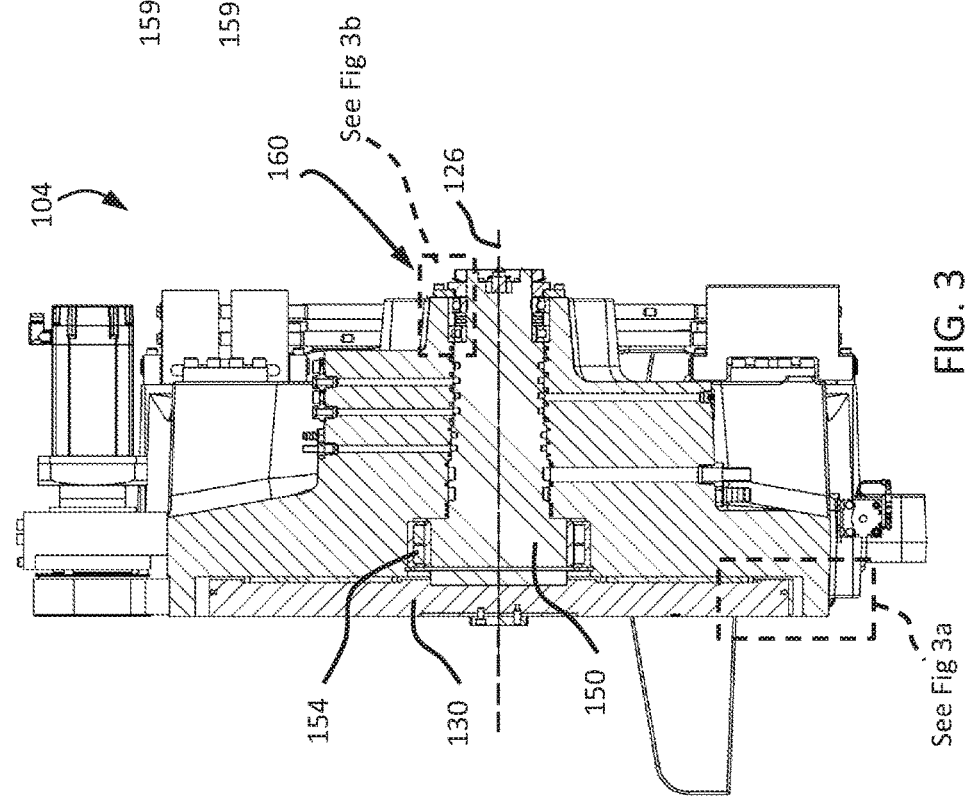

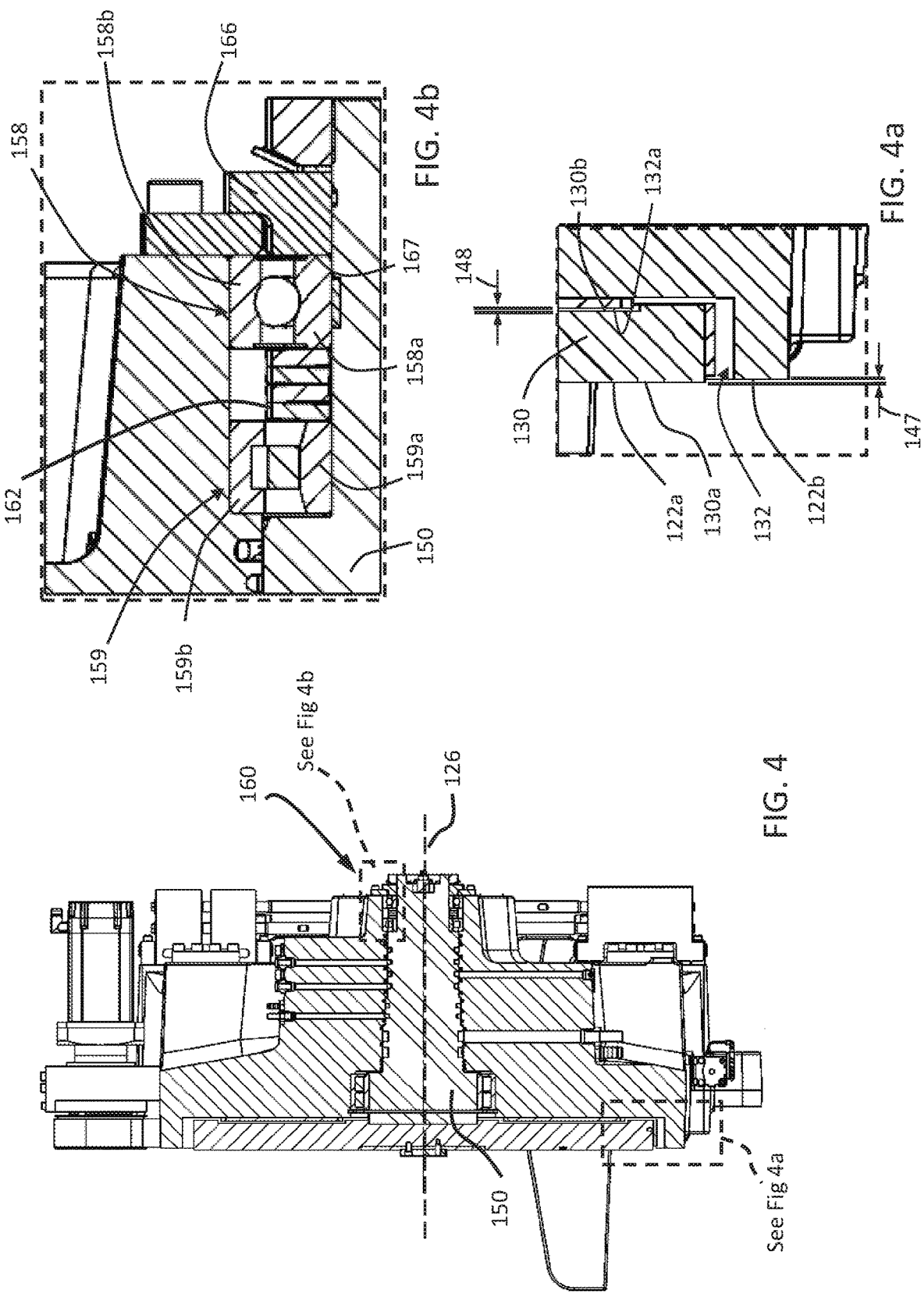

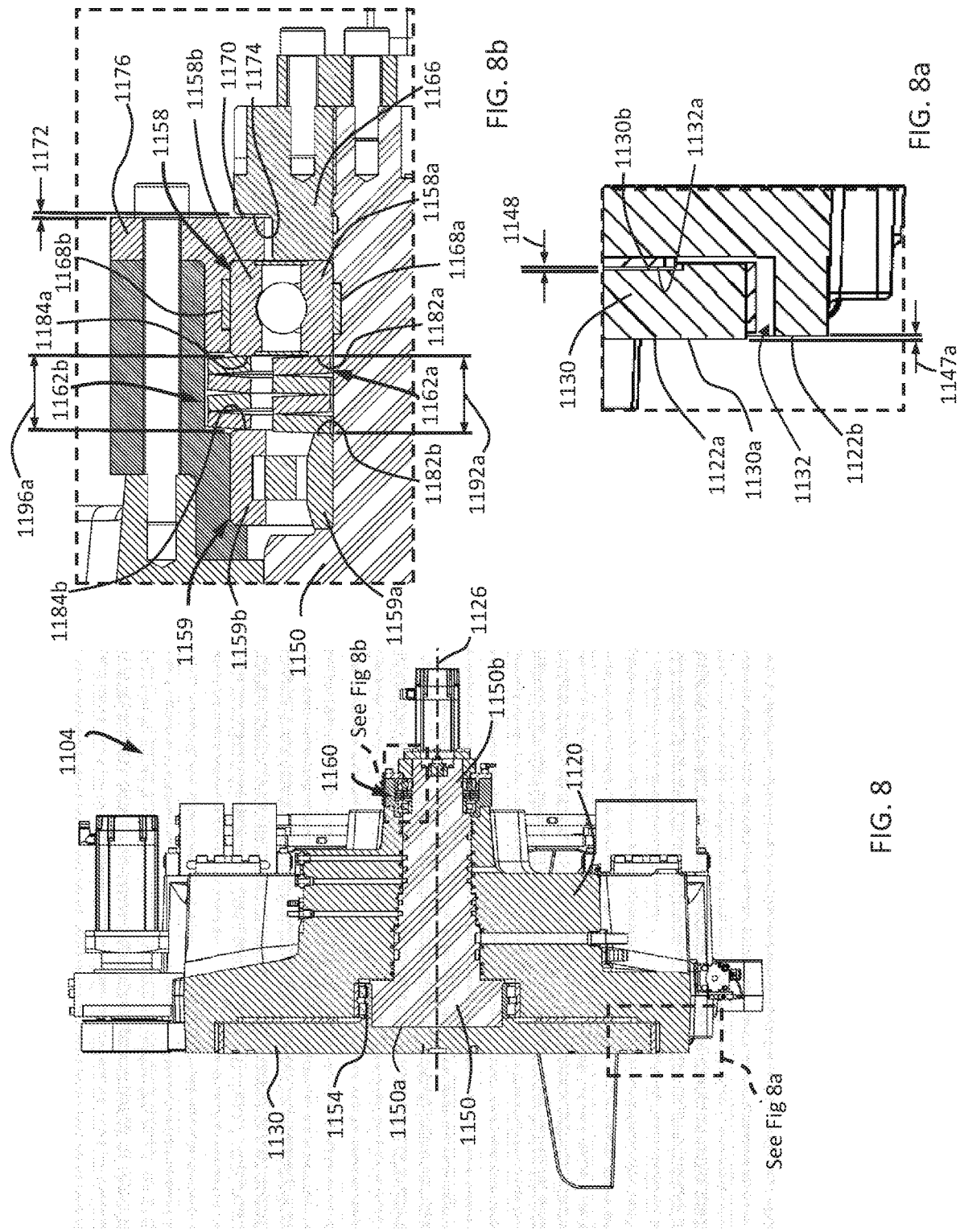

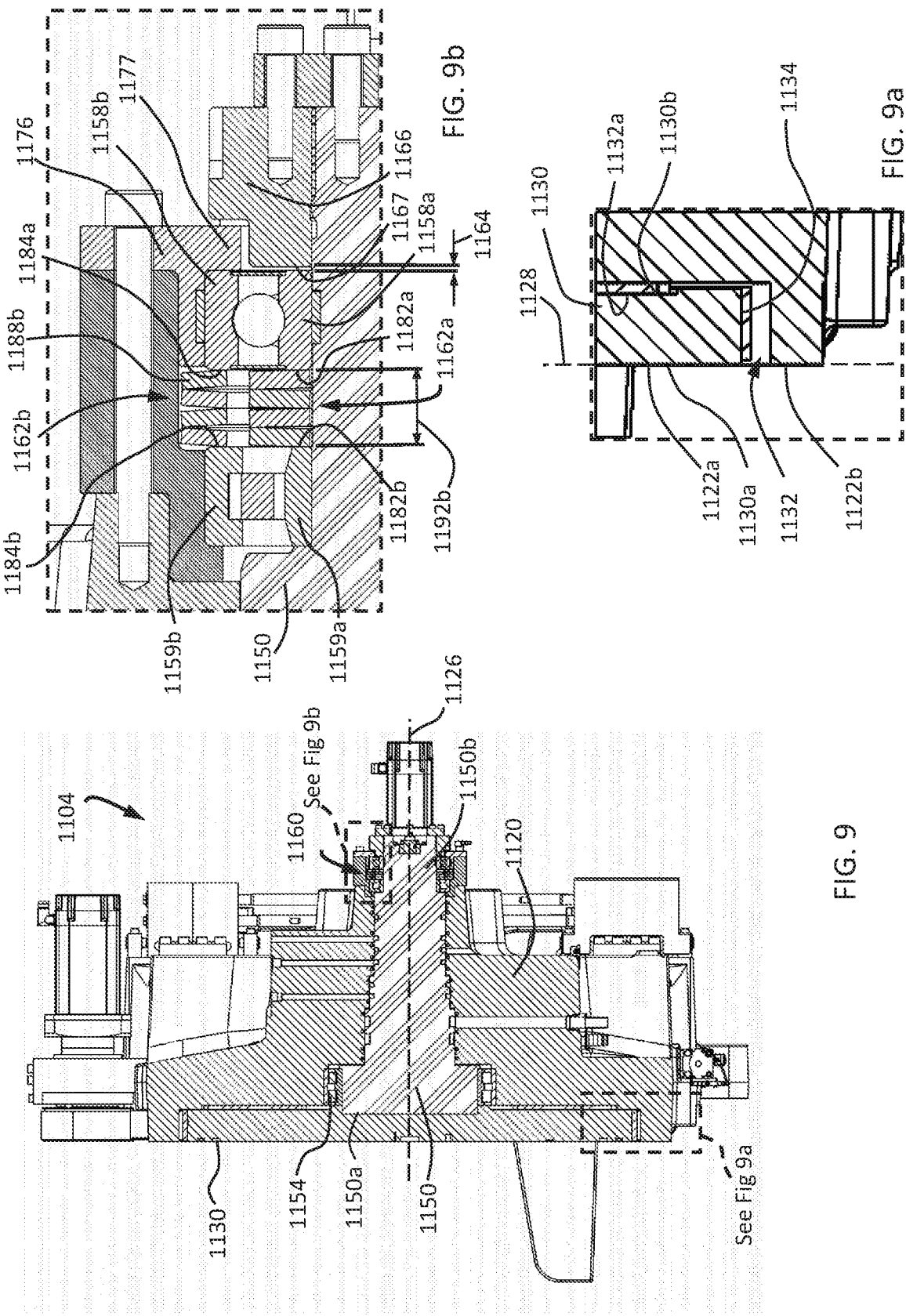

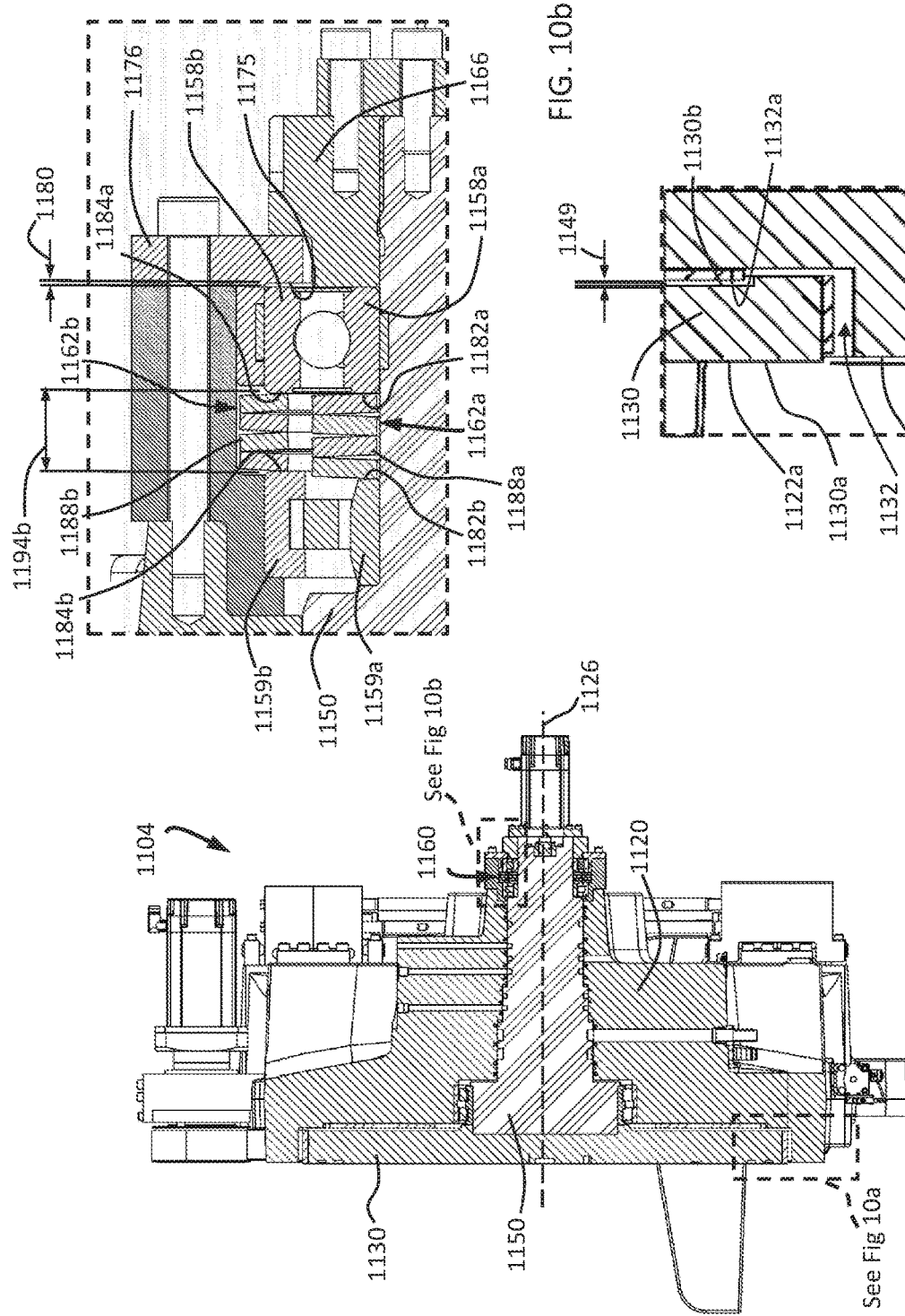
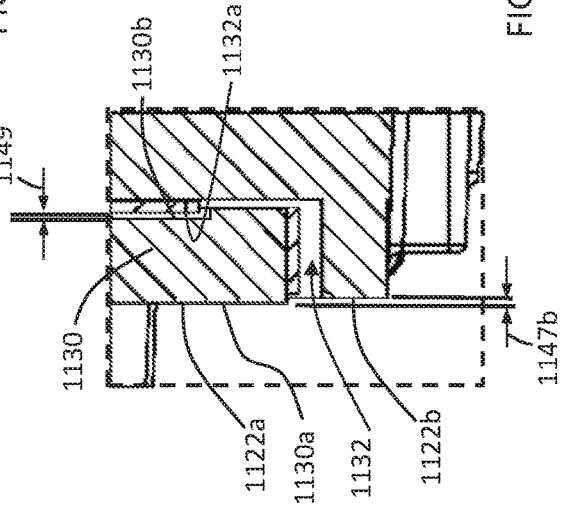
FIG. 10b
FIG. 10a
FIG. 10

PLATEN WITH INTEGRATED ROTARY PLATE

This application is a continuation of PCT Application Serial No. PCT/CA2015/050895, filed Sep. 15, 2015, which claims the benefit of Provisional Application Ser. No. 62/050,472, filed Sep. 14, 2014, each of which is hereby incorporated herein by reference.

FIELD

The specification relates to injection molding machines, elements thereof, and methods and apparatuses for supporting mold portions and/or removing molding articles from mold portions in an injection molding machine.

BACKGROUND

U.S. Pat. No. 8,066,507 (Suzumura) discloses a rotary plate rotatably supported with respect to a stationary base using an R-guide. The weight of the rotary plate and a mold mounted to the rotary plate is also supported by the R-guide in addition to a bearing. Therefore, a moment and a vertical downward load acting on the bearing of the rotary plate can be reduced. A block of the R-guide is fixed with respect to the rotary plate side through a disc spring. Therefore, while the rotary plate is rotating, the elastic force of the disc spring causes the rotary plate to separate from the stationary base by a space, which reduces the rotational resistance of the rotary plate. During mold clamping, respective pressure-receiving surfaces of the rotary plate and the stationary base contact each other against the elastic force of the disc spring, which enables reliable transfer of a mold clamping load to the stationary base.

U.S. Pat. No. 7,220,118 (Nishizawa et al.) discloses a horizontal multi-material molding machine that includes a rotary table having a rotation axis center in a horizontal direction, a multi-material molding metal mold mounted on the rotary table. Injection plunger units are disposed to advance to and retreat from the multi-material molding metal mold for injecting a molten resin into cavities of the multi-material molding metal mold. A servo motor is provided for rotating the rotary table, and a brake mechanism is mounted on the servo motor and actuated when the servo motor is stopped for maintaining the position of the rotary table.

U.S. Pat. No. 6,402,504 (Hahn) discloses a rotatable platen assembly adapted to support a mold used in multi-shot plastic injection molding. The platen assembly includes a non-rotatable machine platen having a central bore formed therethrough. A non-rotatable base plate is connected to the machine platen, the base plate having a central opening aligned with the central bore of the machine platen. A rotating plate is adapted to retain a mold thereon. The rotating plate is provided with a rotatable center axle passing through the central opening in the central bore, and a gear mounted for rotation on the axle. A rack system is engageable with the gear for moving the mold rotating plate between a starting position and a finishing position. A shock absorber arrangement is mounted externally of the base plate for dampening the momentum of the rotating plate between the starting position and the finishing position.

U.S. Pat. App. Pub. No. 2013/0122137 (Clark) discloses support members for rotatable platens of injection molding machines. In some aspects, an injection molding machine includes a guide member and a rotatable platen including a base plate and a turntable supported by and rotatable relative to the base plate about a substantially horizontal axis. The turntable is adapted to support a mold for rotation about the horizontal axis relative to the base plate and the guide member. The injection molding machine also includes a support member coupled to the rotatable platen and engaged with the guide member for movement of the rotatable platen and the support member along the guide member. The turntable is adapted to rotate the mold relative to the support member. In other aspects, a support member for a rotatable platen of an injection molding machine is provided and includes a first arm and a second arm spaced apart from the first arm.

SUMMARY

The following summary is intended to introduce the reader to various aspects of the applicant's teaching, but not to define any invention. In general, disclosed herein are one or more methods or apparatuses related to injection molding, and to supporting molds in injection molding machines.

The teaching herein discloses apparatuses and methods that can improve efficiency in injection molding process, can reduce the amount of time it takes to changeover from running one molded article to another, and can reduce costs both for equipment and operating the equipment. When changing production from one molded article to another, the tooling (in particular, the molds mounted to the platens) must be changed from those for the previous production article to those for the next production article. However, if the production change involves a change to or from a multi-material production article, the tooling change may also require that the platens themselves also be removed and replaced as part of the tool change. It would be advantageous to have a platen apparatus capable of running standard (single material articles) or multi-material articles to avoid purchasing and changing entire platens.

According to one aspect, a platen apparatus for supporting a mold portion in an injection molding machine includes a platen body; a mold mounting face adjacent a front of the platen body for supporting a mold half, the mold mounting face including a rotary central surface that is rotatable about an axis relative to the platen body and a fixed peripheral surface that is fixed relative to the platen body, the peripheral surface disposed about a periphery of the central surface, the central surface and the peripheral surface alignable in a common vertical plane.

In some examples, the central surface may include a plate front surface of a plate mounted in a pocket in the platen body.

In some examples, the plate may include a plate back surface opposite the plate front surface, and the pocket has a front abutment surface, the plate back surface bearing against the front abutment surface when the central surface and peripheral surface are aligned in the common vertical plane.

In some examples, the plate may include a side edge surface extending between the plate front surface and the plate back surface.

In some examples, the side edge surface of the plate may be engaged by a drive mechanism for rotating the plate about the axis.

In some examples, the side edge surface may include plate teeth and the drive mechanism may include a drive belt having belt teeth engaged with the plate teeth.

In some examples, the drive mechanism may include a motor and at least one idler pulley.

In some examples, the plate may be translatable along the axis between advanced and retracted positions, the plate back surface bearing against the front abutment surface when the plate is in the retracted position, and the plate back surface spaced axially apart from the front abutment surface by an advancement clearance gap when the plate is in the advanced position.

In some examples, the advancement clearance gap may be in the range from about 0.5 mm to about 4.0 mm.

In some examples, the platen apparatus may further include a spindle rotatably mounted in the platen body, the plate affixed to the spindle.

According to another aspect, a platen apparatus for supporting a mold portion in an injection molding machine includes (a) a platen body; (b) a plate rotatably mounted to the platen body for supporting a mold half, the plate rotatable relative to the platen body about an axis and translatable relative to the platen body along the axis between a retracted position and an advanced position; and (c) an advancement spring axially captive between an advancement first abutment surface and an advancement second abutment surface spaced axially apart from and rotatably fixed relative to the advancement first abutment surface, the advancement first abutment surface axially locked relative to the platen body and the advancement second abutment surface axially locked relative to the plate during translation of the plate between the retracted and advanced positions, the advancement spring urging the advancement first abutment surface and the advancement second abutment surface axially apart to urge the plate from the retracted position to the advanced position.

In some examples, translation of the plate from the advanced position to the retracted position decreases an axial distance between the advancement first abutment surface and the advancement second abutment surface, compressing the advancement spring.

In some examples, when the plate is in the advanced position, the advancement first and advancement second abutment surfaces are spaced axially apart by an advancement first distance and axially locked relative to one another, and when the plate is in the retracted position, the advancement first and advancement second abutment surfaces are spaced axially apart by an advancement second distance and axially locked relative to one another, the advancement second distance less than the advancement first distance.

In some examples, the apparatus includes a spindle rotatably mounted in the platen body, the plate affixed to the spindle.

In some examples, the advancement spring is generally annular and coaxial with the spindle, and includes a central opening through which the spindle passes.

In some examples, the advancement first abutment surface and the advancement second abutment surface are rotatably fixed relative to the plate.

In some examples, the apparatus includes a first bearing mounted about the spindle and rotatably supporting the spindle in the platen body, the first bearing including a first bearing outer race and a first bearing inner race in fixed axial alignment with the first bearing outer race, the advancement first abutment surface comprising a forward facing axial endface of the first bearing inner race.

In some examples, during translation of the plate between the retracted and advanced positions the first bearing is axially locked relative to the platen body and axially translatable relative to the spindle, the first bearing inner race rotatably fixed relative to the spindle and the first bearing outer race rotatably fixed relative to the platen body.

In some examples, the apparatus includes an inner slide ring mounted radially between an inner surface of the first bearing inner race and an outer surface of the spindle to facilitate axial translation of the first bearing relative to the spindle.

In some examples, the apparatus includes a second bearing mounted about the spindle and rotatably supporting the spindle in the platen body, the second bearing including a second bearing outer race fixed relative to the platen body and a second bearing inner race fixed relative to the spindle and axially translatable relative to the second bearing outer race, the advancement second abutment surface comprising a rearward facing axial endface of the second bearing inner race.

In some examples, the advancement first abutment surface and the advancement second abutment surface are rotatably fixed relative to the platen body.

In some examples, the apparatus includes a first bearing mounted about the spindle and rotatably supporting the spindle in the platen body, the first bearing including a first bearing outer race and a first bearing inner race in fixed axial alignment with the first bearing outer race, the advancement second abutment surface comprising a rearward facing axial endface of the first bearing outer race.

In some examples, during translation of the plate between the retracted and advanced positions the first bearing is axially locked relative to the spindle and axially translatable relative to the platen body, the first bearing inner race rotatably fixed relative to the spindle and the first bearing outer race rotatably fixed relative to the platen body.

In some examples, the apparatus includes an outer slide ring mounted radially between an outer surface of the first bearing outer race and an inner surface fixed relative to the platen body to facilitate axial translation of the first bearing relative to the platen body.

According to another aspect, a platen apparatus for supporting a mold portion in an injection molding machine includes: (a) a platen body; (b) a plate rotatably mounted to the platen body for supporting a mold half, the plate rotatable relative to the platen body about an axis, and translatable relative to the platen body along the axis among a retracted position, a mold break position, and an advanced position intermediate the mold break and retracted positions; and (c) a plate actuator biasing the plate toward the advanced position.

In some examples, the plate includes a plate back surface and the platen body includes a front abutment surface, the plate back surface bearing against the front abutment surface when the plate is in the retracted position, and spaced axially apart from the front abutment surface by an advancement clearance gap when the plate is in the advanced position.

In some examples, the apparatus includes a spindle rotatably mounted in the platen body, the plate affixed to the spindle.

In some examples, the apparatus includes a catch surface axially fixed to the platen body and in axial facing relation to a stop surface axially fixed to the spindle, the stop surface spaced axially apart from the catch surface by a stop surface clearance gap when the plate is in the advanced position, and bearing against the catch surface when the plate is in the mold break position to limit axial separation of the plate and the platen body.

In some examples, the plate actuator includes a mold break spring urging the plate from the mold break position to the advanced position.

In some examples, the mold break spring is generally annular and coaxial with the spindle, and includes a central opening through which the spindle passes.

In some examples, the mold break spring is axially captive between a mold break first abutment surface and a mold break second abutment surface spaced axially apart from and rotatably fixed relative to the mold break first abutment surface, the mold break first abutment surface axially locked relative to the plate and the mold break second abutment surface axially locked relative to the platen body during translation of the plate between the advanced and mold break positions, the mold break spring urging the mold break first abutment surface and the mold break second abutment surface axially apart to urge the plate from the mold break position to the advanced position.

In some examples, translation of the plate from the advanced position to the mold break position decreases an axial distance between the mold break first abutment surface and the mold break second abutment surface, compressing the mold break spring.

In some examples, when the plate is in the advanced position, the mold break first and mold break second abutment surfaces are spaced axially apart by a mold break first distance and axially locked relative to one another, and when the plate is in the mold break position, the mold break first and mold break second abutment surfaces are spaced axially apart by a mold break second distance and axially locked relative to one another, the mold break second distance less than the mold break first distance.

In some examples, the mold break first abutment surface and the mold break second abutment surface are rotatably fixed relative to the platen body.

In some examples, the apparatus includes a first bearing mounted about the spindle and rotatably supporting the spindle in the platen body, the first bearing including a first bearing outer race and a first bearing inner race in fixed axial alignment with the first bearing outer race, the mold break first abutment surface comprising a forward facing axial endface of the first bearing outer race.

In some examples, during translation of the plate between the advanced and mold break positions, the first bearing is axially locked relative to the spindle and axially translatable relative to the platen body, the first bearing inner race rotatably fixed relative to the spindle and the first bearing outer race rotatably fixed relative to the platen body.

In some examples, the apparatus includes an outer slide ring mounted radially between an outer surface of the first bearing outer race and an inner surface fixed relative to the platen body to facilitate axial translation of the first bearing relative to the platen body.

In some examples, the apparatus includes a second bearing mounted about the spindle and rotatably supporting the spindle in the platen body, the second bearing including a second bearing outer race fixed relative to the platen body and a second bearing inner race fixed relative to the spindle and axially translatable relative to the second bearing outer race, the mold break second abutment surface comprising a rearward facing axial endface of the second bearing outer race.

In some examples, the plate actuator includes an advancement spring urging the plate from the retracted position to the advanced position.

In some examples, the advancement and mold break springs are generally annular and coaxial with the spindle, and include respective central openings through which the spindle passes, and wherein an inner diameter of the mold break spring is greater than an outer diameter of the advancement spring, and the mold break spring axially overlaps the advancement spring along a common length of the axis.

In some examples, the mold break first abutment surface and the mold break second abutment surface are rotatably fixed relative to the plate.

In some examples, the apparatus includes a first bearing mounted about the spindle and rotatably supporting the spindle in the platen body, the first bearing including a first bearing outer race and a first bearing inner race in fixed axial alignment with the first bearing outer race, the mold break second abutment surface comprising a rearward facing axial endface of the first bearing inner race.

In some examples, during translation of the plate between the advanced and mold break positions, the first bearing is axially locked relative to the platen body and axially translatable relative to the spindle, the first bearing inner race rotatably fixed relative to the spindle and the first bearing outer race rotatably fixed relative to the platen body.

In some examples, the apparatus includes an inner slide ring mounted radially between an inner surface of the first bearing inner race and an outer surface of the spindle to facilitate axial translation of the first bearing relative to the spindle.

In some examples, the plate actuator includes an advancement spring urging the plate from the retracted position to the advanced position.

In some examples, the advancement and mold break springs are generally annular and coaxial with the spindle, and include respective central openings through which the spindle passes, and wherein an inner diameter of the advancement spring is greater than an outer diameter of the mold break spring, and the advancement spring axially overlaps the mold break spring.

According to another aspect, a method for operating a platen apparatus including a platen body and a mold mounting face adjacent a front of the platen body for supporting a mold half includes: (a) advancing a central surface of the mold mounting face relative to a peripheral surface of the mold mounting face, the peripheral surface fixed to the platen body; (b) after step (a), rotating the central surface relative to the peripheral surface; and (c) after step (b), retracting the central surface into alignment with the peripheral surface in a common vertical plane.

According to another aspect, a method for operating a platen apparatus having a platen body and a plate rotatably mounted to the platen body for supporting a mold half includes: (a) advancing the plate from a retracted position to a mold break position, the plate bearing against the platen body when in the retracted position and spaced apart from the platen body when in the mold break position; (b) retracting the plate from the mold break position to an advanced position intermediate the mold break and retracted positions; and (c) rotating the plate while the plate is in the advanced position.

Other aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 1a is an elevation view of an injection molding machine;

FIG. 1b is an elevation view of another injection molding machine;

FIG. 3 is a section view of the platen apparatus of FIG. 2 taken along the lines 3-3, with a plate portion in a retracted position;

FIGS. 3a and 3b are enlarged portions of the platen apparatus of FIG. 3;

FIG. 4 is a section view of the platen apparatus similar to that of FIG. 3, but with the plate portion in an advanced position;

FIGS. 4a and 4b are enlarged portions of the platen apparatus of FIG. 4;

FIG. 8 is a section view of the platen apparatus of FIG. 6 taken along the lines 8-8, with a plate portion in an advanced position;

FIGS. 8a and 8b are enlarged portions of the platen apparatus of FIG. 8;

FIG. 9 is a section view of the platen apparatus similar to that of FIG. 8, but with the plate portion in a retracted position;

FIGS. 9a and 9b are enlarged portions of the platen apparatus of FIG. 9;

FIG. 10 is a section view of the platen apparatus similar to that of FIG. 8, but with the plate portion in a mold break position;

FIGS. 10a and 10b are enlarged portions of the platen apparatus of FIG. 10;

DETAILED DESCRIPTION

Figure 2:
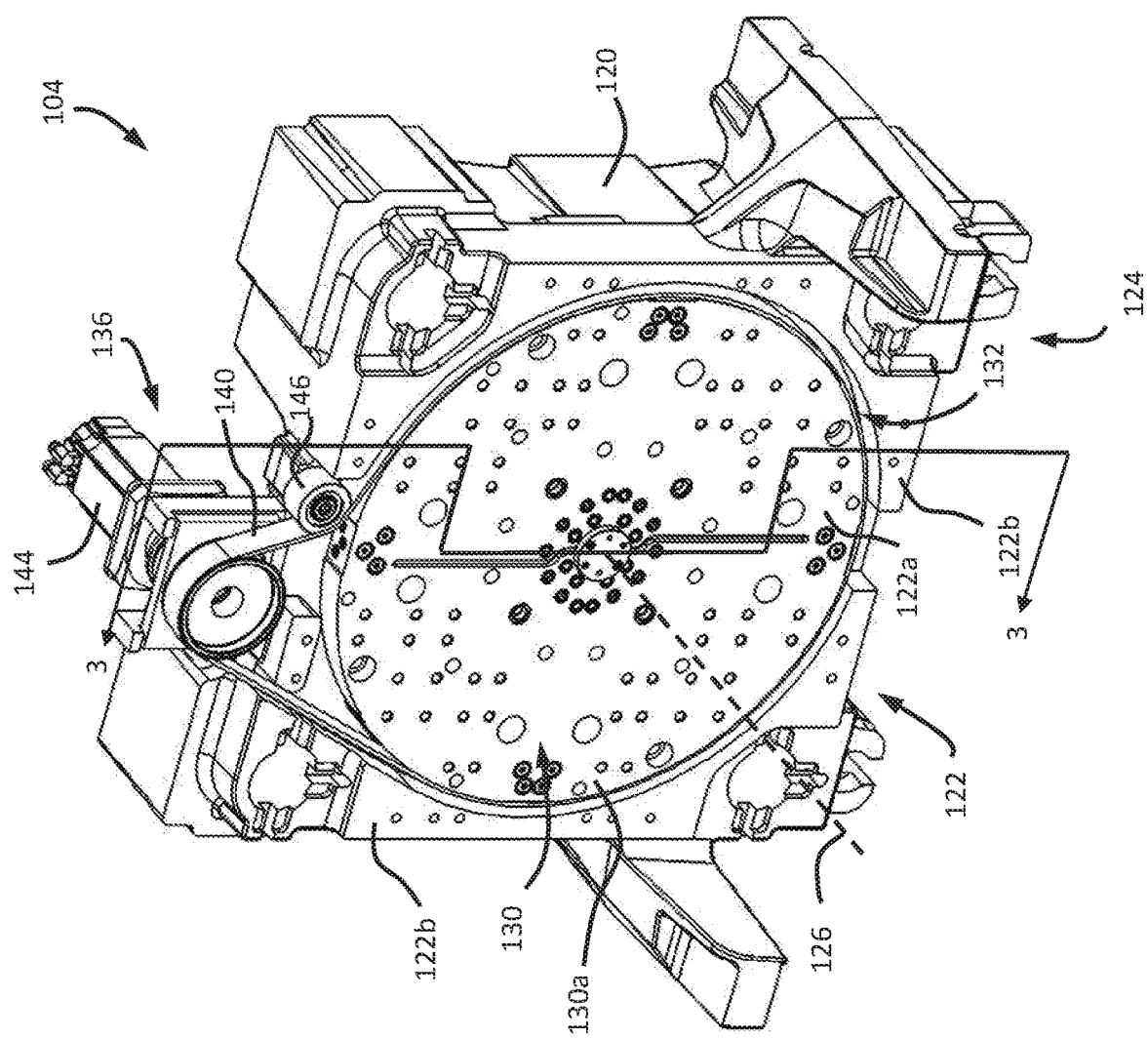
FIG. 2 is an enlarged perspective view of a platen apparatus of the injection molding machine of FIG. 1b.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Referring to FIG. 1a, an example of an injection molding machine 50 includes a base 52, with a moving platen apparatus 54 and a stationary platen apparatus 56 mounted to the base 52 and coupled together via tie bars 58. A mold is formed between the platen apparatuses 54, 56, the mold defined at least in part by a first mold half 54a mounted to the moving platen apparatus 54, and a second mold half 56a mounted to the stationary platen apparatus 56. In the example illustrated, at least one of the platen apparatuses 54, 56 can be configured for optionally rotating the respective mold half mounted thereto At least one injection unit is mounted to the base 52 for injecting resin or other mold material into the mold to form a molded article. In the example illustrated, the injection molding machine 50 includes a first and a second injection unit 50a and 50b. Each injection unit can inject distinct materials to form the molded articles being produced, as part of a multi-material or multi-component injection molding process.

Referring to FIG. 1b, another example of an injection molding machine 100 is illustrated. The injection molding machine 100 has similarities to the injection molding machine 50, and like features are identified by like reference characters, incremented by 50.

The injection molding machine 100 includes a base 102, with a moving platen apparatus 104 and a stationary platen apparatus 106 mounted to the base 102 and coupled together via tie bars 108. A mold is formed between the platen apparatuses 104, 106, the mold defined at least in part by a first mold half 104a mounted to the moving platen apparatus 104, and a second mold half 106a mounted to the stationary platen apparatus 106.

At least one injection unit is mounted to the base 102 for injecting resin or other mold material into the mold to form a molded article. In the example illustrated, the injection molding machine 100 includes a first and a second injection unit 110a and 110b. Each injection unit can inject distinct materials to form the molded articles being produced, as part of a multi-material or multi-component injection molding process.

In the example illustrated, at least one of the platen apparatuses 104, 106 can be configured for optionally rotating the respective mold half mounted thereto. Referring to FIG. 2, in the example illustrated, the platen apparatus 104 includes a platen body 120, which may be of integral, unitary construction and may be made using a casting process.

In the example illustrated, the platen apparatus 104 further includes a mold mounting face 122 adjacent a front 124 of the platen body 120 for supporting the mold half 104a. The mold mounting face 122 includes, in the example illustrated, a rotary central surface 122a that is rotatable about an axis 126 relative to the platen body 120. The mold mounting face 122 further includes a fixed peripheral surface 122b that is fixed relative to the platen body 120. The peripheral surface 122b is disposed about a periphery of the central surface 122a, and the central surface 122a and peripheral surface 122b are alignable in a common vertical plane 128 (see FIG. 3a).

In the example illustrated, the central surface 122a comprises a plate front surface 130a of a plate 130 mounted in a pocket 132 in the platen body 120. Referring to FIG. 4a, in the example illustrated, the plate 130 has a plate back surface 130b opposite the plate front surface 130a, and the pocket 132 has a front abutment surface 132a. Referring to FIG. 3a, the plate back surface 130b bears against the front abutment surface 132a when the central surface 122a and peripheral surface 122b are aligned in the common vertical plane 128.

Figure 5:
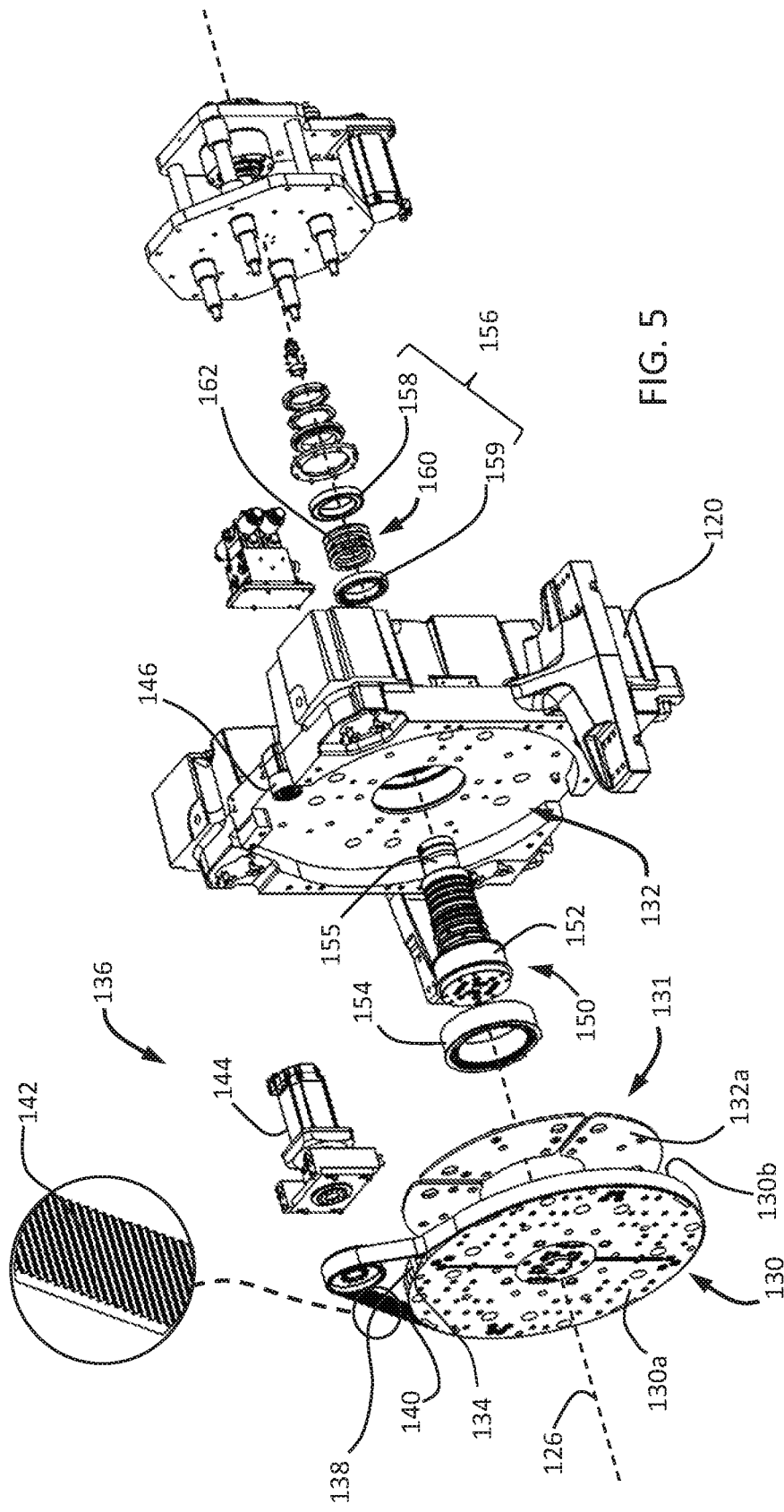
FIG. 5 is an exploded perspective view of the platen apparatus of FIG. 2, including an optional wear pad.

Referring to FIG. 5, the front abutment surface 132a of the pocket 132 may comprise parent material of the platen body 120 or may comprise a face of an optional wear pad 131 (or liner or the like) that may be mounted inside the pocket 132. In the example illustrated, the front abutment surface 132a of the pocket 132 comprises a face of the optional wear pad 131. The plate back surface 130b of the plate 130 may comprise parent material from which the plate 130 is made, or may comprise a back face of an optional wear pad mounted to the plate 130. In the example illustrated, the plate back surface 130b of the plate 130 comprises parent material from which the plate 130 is made.

In the example illustrated, the plate 130 has a side edge surface 134 extending between the plate front surface 130a and the plate back surface 130b. The side edge surface 134 of the plate 130 may be engaged by a drive mechanism 136 for rotating the plate 130 about the axis 126. In the example illustrated, the side edge surface 134 comprises plate teeth 138 and the drive mechanism 136 comprises a drive belt 140 having belt teeth 142 engaged with the plate teeth 138. Referring to FIG. 2, the drive mechanism can further include a motor 144 and at least one idler pulley 146.

The plate 130 is, in the example illustrated, translatable along the axis 126 between advanced (FIG. 4) and retracted (FIG. 3) positions. Referring to FIG. 3a, when the plate 130 is in the retracted position, the plate back surface 130b bears against the front abutment surface 132a of the pocket 132. Referring to FIG. 4a, when the plate 130 is in the advanced position, the plate back surface 130b is spaced axially apart from the front abutment surface 132a by an advancement clearance gap 148. When the plate 130 is in the advanced position, the central surface 122a extends proud of the peripheral surface 122b by a face offset 147 that is generally equal to the advancement clearance gap 148.

The advancement clearance gap 148 can be sized sufficiently large to avoid contact between the plate back surface 130b and the front abutment surface 132a during rotation of the plate 130, but small enough to avoid excess travel (and lapse of time) when translating the plate 130 between the advanced and retracted positions. Satisfactory results may be obtained with an advancement clearance gap 148 sized in the range from about 0.5 mm to about 4 mm. In the example illustrated, the advancement clearance gap 148 is in the range of about 0.8 mm to about 1.0 mm.

Referring to FIG. 5, the platen apparatus 104 may include a spindle 150 rotatably mounted in the platen body 120, and the plate 130 can be affixed to the spindle 150. In the example illustrated, the spindle 150 includes a front journal 152 about which a front bearing 154 is mounted. In the example illustrated, the front bearing 154 is a high capacity needle bearing.

The spindle also includes, in the example illustrated, a rear journal 155 about which a rear bearing 156 is mounted. In the example illustrated, the rear bearing 156 comprises first and second bearings 158, 159 mounted on respective first and second journals 155a, 155b (see FIG. 3b) of the rear journal 155. The first bearing 158 can be a deep groove ball bearing, and the second bearing 159 can be a cylindrical roller bearing.

Referring to FIG. 5, the platen apparatus 104 can further include a plate actuator 160 to translate the plate 130 from at least one to the other of the advanced and retracted positions. In the example illustrated, the plate actuator 160 includes an advancement spring 162 for urging the plate from the retracted position to the advanced position. The advancement spring 162 can comprise a plurality of coned-disc springs (also called Belleville washers), and in the example illustrated includes 4 coned-disc springs (see FIG. 3b).

Referring to FIG. 3b, closing of the mold during operation of the machine pushes the plate 130 from the advanced position to the retracted position, compressing the advancement spring 162. The spindle 150 is pushed back with the plate 130, and an axial first bearing gap 164 opens between a rearward facing surface of a first bearing inner race 158a of the first bearing 158, and a forward facing spindle engagement surface 167 of a stop ring 166 fixed to the spindle 150. The second bearing 159 includes a second bearing inner race 159a fixed to move with the spindle 150, and a second bearing outer race 159b fixed relative to the platen body 120. In the example illustrated, the second bearing 159 accommodates axial misalignment between the second bearing inner and outer races 158a, 158b caused by the short stroke translation of the spindle 150 when moving between the advanced and retracted positions.

In the example illustrated, the first bearing inner race 158a and the first bearing outer race 158b of the first bearing 158 remain in fixed axial alignment relative to one another. The first bearing outer race 158b is fixed relative to the platen body 120, and the second journal 155b comprises an inner slide ring 168 to facilitate translation of the spindle 150 relative to the first bearing inner race 158a. In this way, translation when moving to the retracted position (i.e. moving to the right in FIG. 3b) is associated with translation of the second bearing inner race 159a towards the right, and no translation of the first bearing inner race 158a (beneath which the spindle is permitted to translate to the right), thereby reducing the spacing between the first and second bearings 158, 159, compressing the advancement spring 162, and opening the first bearing gap 164.

Referring to FIG. 4b, when the mold opens after an injection cycle, the advancement spring 162 can decompress and push the plate 130 back to the advanced position. The advancement spring 162 can push the plate 130 (and spindle 150) forward until the first bearing gap 164 is taken up by the advancing stop ring 166 (i.e. until the spindle engagement surface 167 of the stop ring 166 abuts the rearward facing surface of the first bearing inner race 158a). This opens the advancement clearance gap 148 (FIG. 4a). The plate 130 can then rotate without having the plate back surface 130b of the plate 130 rub against the front abutment surface 132a of the pocket 132. During rotation of the plate 130 and the spindle 150, the advancement spring 162 (which is compressed between the first and second bearing inner races 158a, 159a) can also rotate, further reducing friction and wear on the components of the platen apparatus 104.

Figure 6:
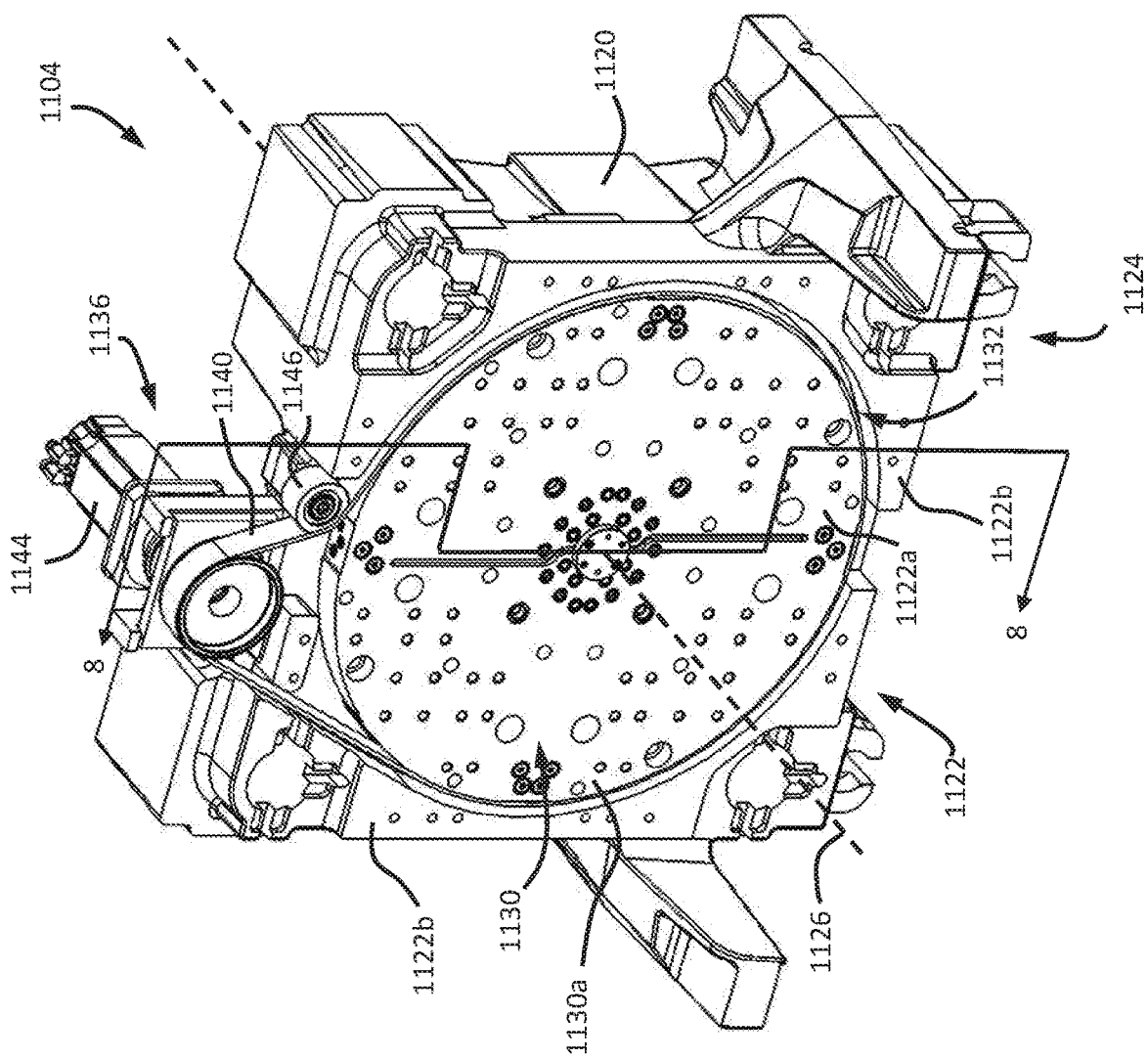
FIG. 6 is an enlarged perspective view of another platen apparatus for use with the injection molding machine of FIG. 1b.

Referring to FIG. 6, another platen apparatus 1104 for use with the injection molding machine 100 is illustrated. The platen apparatus 1104 has similarities to the platen apparatus 104, and like features are identified by like reference characters, incremented by 1000.

In the example illustrated, the platen apparatus 1104 includes a platen body 1120, and a mold mounting face 1122 adjacent a front 1124 of the platen body 1120 for supporting the mold half 104a. The mold mounting face 1122 includes, in the example illustrated, a rotary central surface 1122a that is rotatable about an axis 1126 relative to the platen body 1120. The mold mounting face 1122 further includes a fixed peripheral surface 1122b that is fixed relative to the platen body 1120. The peripheral surface 1122b is disposed about a periphery of the central surface 1122a, and the central surface 1122*a* and peripheral surface 1122*b* are alignable in a common vertical plane 1128 (see FIG. 9*a*).

Figure 7:
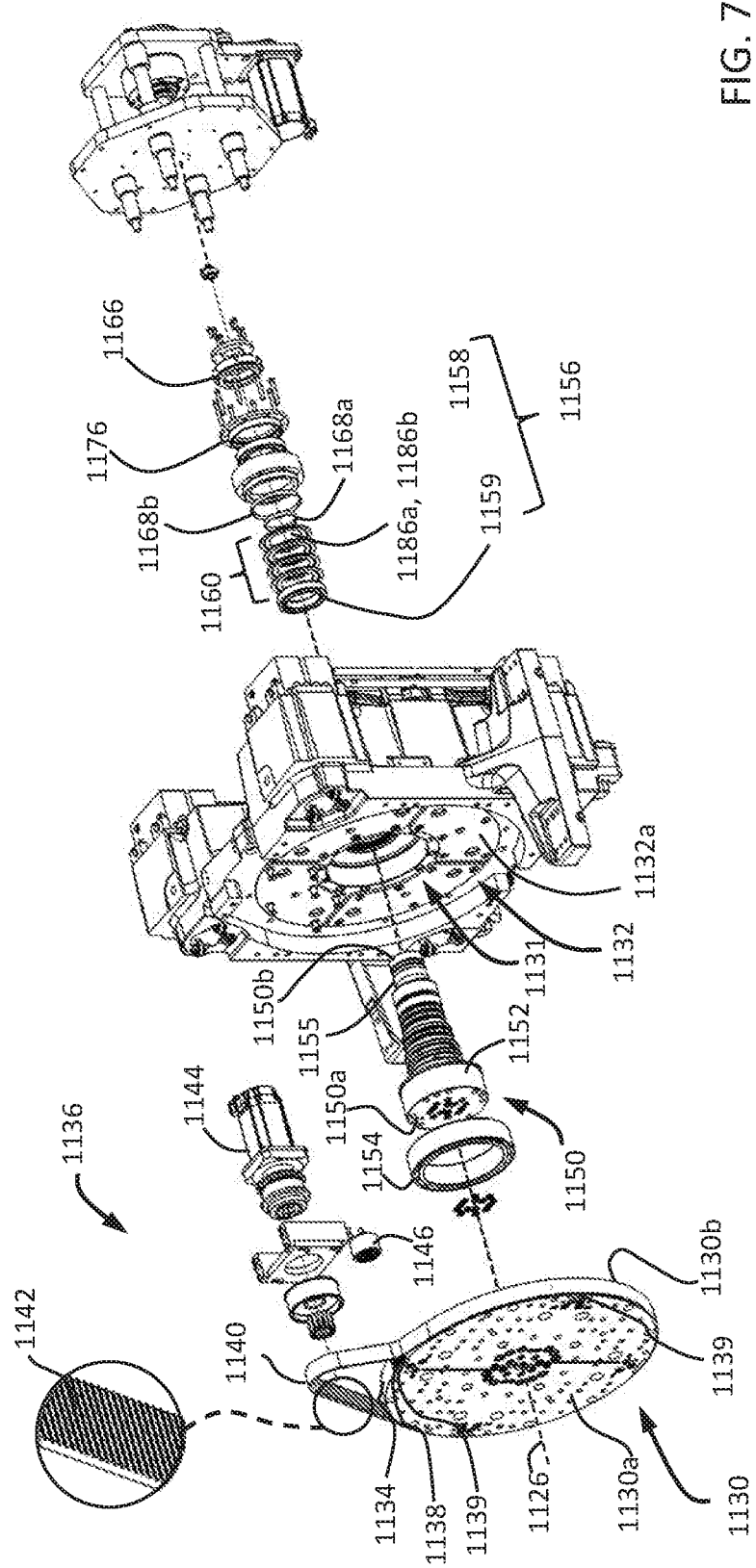
FIG. 7 is an exploded perspective view of the platen apparatus of FIG. 6, including an optional wear pad.

In the example illustrated, the central surface 1122*a* comprises a plate front surface 1130*a* of a plate 1130 mounted in a pocket 1132 in the platen body 1120. Referring to FIG. 9*a*, in the example illustrated, the plate 1130 has a plate back surface 1130*b* opposite the plate front surface 1130*a*, and the pocket 1132 has a front abutment surface 1132*a*. Referring to FIG. 8*a*, the plate back surface 1130*b* bears against the front abutment surface 1132*a* when the central surface 1122*a* and peripheral surface 1122*b* are aligned in the common vertical plane 1128. Referring to FIG. 7, in the example illustrated, the front abutment surface 1132*a* of the pocket 1132 comprises a face of an optional wear pad 1131 mounted inside the pocket 1132. The plate back surface 1130*b* of the plate 1130 comprises parent material from which the plate 1130 is made.

Referring to FIG. 7, in the example illustrated, the plate 1130 has a side edge surface 1134 extending between the plate front surface 1130*a* and the plate back surface 1130*b*. The side edge surface 1134 of the plate 1130 may be engaged by a drive mechanism 1136 for rotating the plate 1130 about the axis 1126. In the example illustrated, the platen apparatus 1104 includes a plurality of plate tooth segments 1139 mounted to and spaced circumferentially apart about the side edge surface 1134. Each of the plate tooth segments 1139 comprises a plurality of plate teeth 1138, and the drive mechanism 1136 comprises a drive belt 1140 having belt teeth 1142 for engaging the plate teeth 1138. In the example illustrated, the platen apparatus 1104 includes 4 plate tooth segments 1139 each having a circumferential extent corresponding to an arc in the range of about 5 to 10 degrees, the centers of adjacent tooth segments spaced circumferentially apart from one another about the side edge surface 1134 by about 90 degrees. Referring to FIG. 6, the drive mechanism can further include a motor 1144 and at least one idler pulley 1146.

The platen apparatus 1104 can be used in a non-rotating configuration, for example, by bolting the plate 1130 against the front abutment surface 1132*a*. All or most of the surface area of the plate back surface 1130*b* can abut the front abutment surface 1132*a* to transfer clamp load exerted across the mold to the platen body 1120.

The mold half 104*a* can be mounted against the central surface 1122*a*. Optionally, in the non-rotating configuration, the mold half 104*a* can also be mounted to and/or supported against the peripheral surface 1122*b*. This can provide a larger mounting surface area and/or load transfer surface area for accommodating larger mold halves. When a clamp load is applied across the mold halves 104*a*, 106*a*, the mold half 104*a* can bear against the central surface 1122*a*, and optionally against the peripheral surface 1122*b*, to transfer the clamp load to the platen body 1120.

When using the platen apparatus 1104 for production of multi-material articles, the mold half 104*a* is mounted against the central surface 1122*a*. The plate 1130 is rotatable relative to the platen body 1120 about the axis 1126, and translatable along the axis 1126 between advanced (FIG. 8), retracted (FIG. 9), and mold break (FIG. 10) positions. In the example illustrated, the advanced position is intermediate the retracted and mold break positions.

Referring to FIG. 8*a*, when the plate 1130 is in the advanced position, the plate back surface 1130*b* is spaced axially apart from the front abutment surface 1132*a* by an advancement clearance gap 1148. When the plate 1130 is in the advanced position, the central surface 1122*a* extends proud of the peripheral surface 1122*b* by a first face offset 1147*a* that is generally equal to the advancement clearance gap 1148. The advancement clearance gap 1148 can be sized sufficiently large to avoid contact between the plate back surface 1130*b* and the front abutment surface 1132*a* during rotation of the plate 1130, but small enough to avoid excess travel (and lapse of time) when translating the plate 1130 between the advanced and retracted positions.

Referring to FIG. 9*a*, when the plate 1130 is in the retracted position, the plate back surface 1130*b* bears against the front abutment surface 1132*a*. All or most of the surface area of the plate back surface 1130*b* abuts the front abutment surface 1132*a* to transfer clamp load exerted across the mold to the platen body 1120. When the plate 1130 is in the retracted position and a clamp load is applied across the mold halves 104*a*, 106*a*, the mold half 104*a* can bear against the central surface 1122*a* to transfer the clamp load to the platen body 1120. Optionally, the mold half 104*a* can also bear against the peripheral surface 1122*b* when the plate 1130 is in the retracted position. This can accommodate larger mold halves and provide a larger surface area for transferring the clamp load to the platen body 1120.

Referring to FIG. 10*a*, when the plate 1130 is in the mold break position, the plate back surface 1130*b* is spaced axially apart from the front abutment surface 1132*a* by a mold break gap 1149. In the example illustrated, the mold break gap 1149 is greater than the advancement clearance gap 1148. When the plate 1130 is in the mold break position, the central surface 1122*a* extends proud of the peripheral surface 1122*b* by a second face offset 1147*b* that is generally equal to the mold break gap 1149.

Referring to FIG. 7, in the example illustrated, the platen apparatus 1104 includes a spindle 1150 rotatably mounted in the platen body 1120, and rotatable about the axis 126. The plate 1130 is affixed to the spindle 1150. In the example illustrated, the plate 1130 is affixed to a spindle front end 1150*a* of the spindle 1150.

Referring to FIG. 8*b*, in the example illustrated, the platen apparatus 1104 can include a catch surface 1174 axially fixed relative to the platen body 1120, and a stop surface 1170 axially fixed relative to the spindle 1150 and in axial facing relation to the catch surface 1174. Referring to FIG. 10*b*, the stop surface 1170 bears against the catch surface 1174 when the plate 1130 is in the mold break position to limit axial separation of the plate 1130 and the platen body 1120. Referring to FIG. 8*b*, in the example illustrated, the stop surface 1170 is spaced axially apart from the catch surface 1174 by a stop surface clearance gap 1172 when the plate 1130 is in the advanced position. The stop surface clearance gap 1172 can be sized sufficiently large to avoid contact between the stop surface 1170 and the catch surface 1174 during rotation of the plate 1130 when in the advanced position, but small enough to avoid excess travel when translating the plate 1130 between the advanced and mold break positions.

In the example illustrated, the platen apparatus includes a collar 1176 affixed to a rear surface of the platen body 1120 opposite the front abutment surface 1132*a*. The catch surface 1174 comprises a rearward facing surface of the collar 1176. The platen apparatus further includes a stop ring 1166 affixed to the spindle 1150 adjacent a spindle rear end 1150*b* opposite the spindle front end 1150*a*. The stop surface 1170 comprises a radially outer forward facing step surface of the stop ring 1166.

Referring to FIG. 7, in the example illustrated, the spindle 1150 includes a front journal 1152 about which a front bearing 1154 is mounted. The front bearing 1154 can rotatably support a front portion of the spindle 1150 in the platen body 1120. In the example illustrated, the front bearing 1154 is a high capacity needle bearing. The spindle also includes, in the example illustrated, a rear journal 1155 about which a rear bearing 1156 is mounted. The rear bearing 1156 can rotatably support a rear portion of the spindle in the platen body 1120.

In the example illustrated, the rear bearing 1156 includes a first bearing 1158 mounted about the spindle 1150 and rotatably supporting the spindle 1150 in the platen body 1120. In the example illustrated, the first bearing 1158 is mounted about a first journal 1155*a* of the rear journal 1155 adjacent the spindle rear end 1150*b*. The first bearing 1158 can be a deep groove ball bearing.

In the example illustrated, the first bearing 1158 includes a first bearing inner race 1158*a* and a first bearing outer race 1158*b* in fixed axial alignment with the first bearing inner race 1158*a*. The first bearing inner race is rotatably fixed relative to the spindle 1150 (and the plate 1130), and can rotate about the axis 1126 with the spindle 1150 during rotation of the plate 1130. The first bearing outer race 1158*b* is rotatably fixed relative to the platen body 1120.

Referring to FIGS. 8*b* and 9*b*, in the example illustrated, when the plate 1130 moves between the retracted and advanced positions, the first bearing 1158 is axially locked relative to the platen body 1120 and axially translatable relative to the spindle 1150. In the example illustrated, the platen apparatus 1104 includes an inner slide ring 1168*a* mounted radially between an inner surface of the first bearing inner race 1158*a* and an outer surface of the spindle 1150. The inner slide ring 1168*a* can facilitate axial translation of the first bearing 1158 relative to the spindle 1150. In the example illustrated, the inner slide ring 1168*a* is mounted about the first journal 1155*a*.

In the example illustrated, the platen apparatus 1104 includes a platen body engagement surface 1175 axially fixed relative to the platen body 1120 and in axial facing relation to a rearward facing axial endface of the first bearing outer race 1158*b*. During translation of the plate 1130 between the retracted and advanced positions, the rearward facing axial endface of the first bearing outer race 1158*b* bears against the platen body engagement surface 1175, axially locking the first bearing 1158 relative to the platen body 1120. The platen body engagement surface 1175 and the rearward facing axial endface of the first bearing outer race 1158*b* are spaced axially apart by a platen body engagement surface gap 1180 when the plate 1130 is in the mold break position.

In the example illustrated, the first bearing 1158 is retained in a recess bounded radially by an inner surface affixed to the platen body 1120 and an outer surface of the spindle 1150. The collar 1176 affixed to the platen body 1120 comprises an annular body having a radially inner portion 1177 (FIG. 9*b*) that extends radially inwardly of the recess in which the first bearing 1158 is retained. The platen body engagement surface 1175 comprises a forward facing underside surface of the radially inner portion of the collar 1176.

Referring to FIGS. 8*b* and 10*b*, in the example illustrated, when the plate 1130 moves between the mold break and advanced positions, the first bearing 1158 is axially translatable relative to the platen body 1120 and axially locked relative to the spindle 1150. In the example illustrated, the platen apparatus 1104 includes an outer slide ring 1168*b* mounted radially between an outer surface of the first bearing outer race 1158*b* and an inner surface fixed relative to the platen body 1120. The outer slide ring 1168*b* can facilitate axial translation of the first bearing relative to the platen body 1120. In the example illustrated, the outer slide ring 1168*b* is mounted about the second journal 1155*b*.

Referring to FIG. 8*b*, in the example illustrated, the platen apparatus 1104 includes a spindle engagement surface 1167 fixed relative to the spindle 1150 and in facing relation to a rearward facing axial endface of the first bearing inner race 1158*a*. Referring to FIGS. 9*a* and 10*a*, when the plate 1130 moves between the mold break and advanced positions, the spindle engagement surface 1167 bears against the rearward facing axial endface of the first bearing inner race 1158*a*, axially locking the first bearing 1158 relative to the spindle 1150. The spindle engagement surface 1167 and the rearward facing axial endface of the first bearing inner race 1158*a* are spaced axially apart by a first bearing gap 1164 when the plate 1130 is in the retracted position. In the example illustrated, the spindle engagement surface 1167 comprises a radially inner forward facing step surface of the stop ring 1166 affixed to the spindle 1150.

The rear bearing 1156 can further include a second bearing 1159 mounted about the spindle 1150 and rotatably supporting the spindle 1150 in the platen body 1120. In the example illustrated, the second bearing 1159 is mounted about a second journal 1155*b* (see FIG. 8*b*) of the rear journal 1155, and is intermediate the plate 1130 and the first bearing 1158. The second bearing 1159 can be a cylindrical roller bearing.

In the example illustrated, the second bearing 1159 includes a second bearing outer race 1159*b* fixed relative to the platen body 1120, and a second bearing inner race 1159*a* fixed relative to the spindle 1150 and axially translatable relative to the second bearing outer race 1159*b*. The second bearing 1159 accommodates axial misalignment between the second bearing inner and outer races 1159*a*, 1159*b* caused by the short stroke translation of the spindle 1150 when moving among the advanced, retracted, and mold break positions.

Referring to FIG. 7, the platen apparatus 1104 can further include a plate actuator 1160 to translate the plate 1130 from at least one to another of the advanced, retracted, and mold break positions. In the example illustrated, the plate actuator urges the plate 1130 from the retracted position to the advanced position, and from the mold break position to the advanced position. In the example illustrated, the plate actuator 1160 biases the plate 1130 toward the advanced position.

In the example illustrated, the plate actuator 1160 includes an advancement spring 1162*a* urging the plate from the retracted position to the advanced position. The advancement spring 1162*a* is annular, and includes a central opening 1186*a* through which the spindle 1150 passes. In the example illustrated, the advancement spring 1162*a* is rotatably fixed relative to the plate 1130 (and the spindle 1150), and can rotate about the axis 1126 with the spindle 1150 during rotation of the plate 1130.

In the example illustrated, the advancement spring 1162*a* extends along an axial portion of the spindle 1150, and is generally coaxial with the axis 1126. The advancement spring 1162*a* is symmetrical about the axis 1126, and has a center of mass that generally coincides with the axis 1126. This can facilitate balanced rotation of the advancement spring 1162*a* about the axis 1126 during rotation of the plate 1130.

In the example illustrated, the advancement spring 1162*a* comprises a plurality of first coned-disc elements 1188*a* (FIG. 10*b*) mounted about and coaxial with the spindle 1150. Each of the first coned-disc elements 1188*a* has a center of mass that generally coincides with the axis 1126. Each of the first coned-disc elements 1188*a* can comprise a coned-disc spring, and in the example illustrated, the advancement spring 1162*a* includes 4 axially stacked coned-disc springs (see FIG. 8*b*).

In the example illustrated, the advancement spring 1162*a* can transition between a preloaded state and an energized state during normal operation of the platen apparatus 1104. The preloaded state corresponds to a decompressed state of the advancement spring 1162*a* in which the advancement spring 1162*a* has a lowest energy level during normal operation of the platen apparatus 1104. The advancement spring 1162*a* is in the preloaded (decompressed) state when the plate 1130 is in the advanced and mold break positions. The energized state corresponds to a compressed state of the advancement spring 1162*a* in which the advancement spring 1162*a* stores a highest potential energy during normal operation of the platen apparatus 1104. The advancement spring 1162*a* is in the energized (compressed) state when the plate 1130 is in the retracted position.

In the example illustrated, the platen apparatus 1104 includes an advancement first abutment surface 1182*a* and an advancement second abutment surface 1182*b* spaced axially apart from the advancement first abutment surface 1182*a*. During translation of the plate 1130 between the retracted and advanced positions, the advancement first abutment surface 1182*a* is axially locked relative to the platen body 1120, and the advancement second abutment surface 1182*b* is axially locked relative to the plate 1130 (and the spindle 1150).

In the example illustrated, the advancement first and advancement second abutment surfaces 1182*a*, 1182*b* are rotatably fixed relative to one another. In the example illustrated, the advancement first and advancement second abutment surfaces 1182*a*, 1182*b* are rotatably fixed relative to the plate 1130 (and the spindle 1150), and can rotate about the axis 1126 with the spindle 1150 during rotation of the plate 1130. Rotation of one of the advancement abutment surfaces 1182*a*, 1182*b* about the axis 1126 occurs synchronously with rotation of the other one of the advancement abutment surfaces 1182*a*, 1182*b* about the axis 1126.

In the example illustrated, the advancement first and advancement second abutment surfaces 1182*a*, 1182*b* are annular, extend about the spindle 1150, and are generally coaxial with the axis 1126. The advancement first abutment surface 1182*a* comprises a forward facing axial endface of the first bearing inner race 1158*a*. The advancement second abutment surface 1182*b* comprises a rearward facing axial endface of the second bearing inner race 1159*a*.

In the example illustrated, the advancement spring 1162*a* is axially captive between and bears against the advancement first and advancement second abutment surfaces 1182*a*, 1182*b*. The advancement spring 1162*a* urges the advancement first abutment surface 1182*a* and the advancement second abutment surface 1182*b* axially apart to urge the plate 1130 from the retracted position to the advanced position. The advancement spring 1162*a* bears against at least a portion of the advancement abutment surfaces 1182*a*, 1182*b*, and in the example illustrated, abuts the advancement abutment surfaces 1182*a*, 1182*b* generally continuously (360 degrees) about the axis 1126. The advancement spring 1162*a* is rotatably fixed relative to the advancement abutment surfaces 1182*a*, 1182*b*, and can rotate about the axis 1126 with the advancement abutment surfaces 1182*a*, 1182*b* during rotation of the plate 1130.

In the example illustrated, when the plate 1130 is in one of the advanced and mold break positions, the advancement first abutment surface 1182*a* and the advancement second abutment surface 1182*b* are spaced axially apart by an advancement first distance 1192*a* and axially locked relative to one another. When the plate 1130 is in the retracted position, the advancement first abutment surface 1182*a* and the advancement second abutment surface 1182*b* are spaced axially apart by an advancement second distance 1192*b* and axially locked relative to one another. The advancement second distance 1192*b* is less than the advancement first distance 1192*a*. The advancement first distance 1192*a* corresponds to the decompressed state of the advancement spring 1162*a*. The advancement second distance 1192*b* corresponds to the compressed state of the advancement spring 1162*a*.

In the example illustrated, the plate actuator 1160 includes a mold break spring 1162*b* for urging the plate 1130 from the mold break position to the advanced position. The mold break spring 1162*b* is annular, and includes a central opening 1186*b* through which the spindle 1150 passes.

In the example illustrated, the mold break spring 1162*b* extends along an axial portion of the spindle 1150, and is generally coaxial with the axis 1126. In the example illustrated, the mold break spring 1162*b* has an inner diameter that is greater than an outer diameter of the advancement spring 1162*a*, and the mold break spring 1162*b* axially overlaps the advancement spring 1162*a* along a common length of the axis 1126. Axially overlapping the advancement and mold break springs 1162*a*, 1162*b* can provide a more axially compact platen apparatus 1104.

In the example illustrated, the mold break spring 1162*b* is symmetrical about the axis 1126, and has a center of mass that generally coincides with the axis 1126. In the example illustrated, the mold break spring 1162*b* comprises a plurality of second coned-disc elements 1188*b* (FIG. 9*b*) mounted about and coaxial with the spindle 1150. Each of the second coned-disc elements 1188*b* has a center of mass that generally coincides with the axis 1126. Each of the second coned-disc elements can comprise a coned-disc spring, and in the example illustrated, the mold break spring 1162*b* includes 4 axially stacked coned-disc springs (see FIG. 8*b*).

In the example illustrated, the mold break spring 1162*b* can transition between a preloaded state and an energized state during normal operation of the platen apparatus 1104. The preloaded state corresponds to a decompressed state of the mold break spring 1162*b* in which the mold break spring 1162*b* has a lowest energy level during normal operation of the platen apparatus 1104. The mold break spring 1162*b* is in the preloaded (decompressed) state when the plate 1130 is in the advanced and retracted positions. The energized state corresponds to a compressed state of the mold break spring 1162*b* in which the mold break spring 1162*b* stores a highest potential energy during normal operation of the platen apparatus 1104. The mold break spring 1162*b* is in the energized (compressed) state when the plate 1130 is in the mold break position.

In the example illustrated, the platen apparatus 1104 includes a mold break first abutment surface 1184*a* and a mold break second abutment surface 1184*b* spaced axially apart from the mold break first abutment surface 1184*a*. During translation of the plate 1130 between the advanced and mold break positions, the mold break first abutment surface 1184*a* is axially locked relative to the plate 1130 (and the spindle 1150) and the mold break second abutment surface 1184*b* is axially locked relative to the platen body 1120.

In the example illustrated, the mold break abutment surfaces 1184*a*, 1184*b* are rotatably fixed relative to one another. In the example illustrated, the mold break first and mold break second abutment surfaces 1184a, 1184b are rotatably fixed relative to the platen body 1120, and do not rotate about the axis 1126 during rotation of the plate 1130.

In the example illustrated, the mold break abutment surfaces 1184a, 1184b are annular, extend about the spindle 1150, and are generally coaxial with the axis 1126. In the example illustrated, the mold break first abutment surface 1184a comprises a forward facing axial endface of the first bearing outer race 1158b. The mold break second abutment surface 1184b comprises a rearward facing axial endface of the second bearing outer race 1159b. In the example illustrated, the mold break first abutment surface 1184a is axially fixed relative to the advancement first abutment surface 1182a, and the mold break first abutment surface 1184a and the advancement first abutment surface 1182a are aligned in a common vertical plane.

In the example illustrated, the mold break spring 1162b is axially captive between and bears against the mold break first and mold break second abutment surfaces 1184a, 1184b. The mold break spring 1162b urges the mold break first abutment surface 1184a and the mold break second abutment surface 1184b axially apart to urge the plate 1130 from the mold break position to the advanced position. The mold break spring 1162b bears against at least a portion of the mold break abutment surfaces 1184a, 1184b, and in the example illustrated, abuts the mold break abutment surfaces 1184a, 1184b continuously (30 degrees) about the axis 1126. The mold break spring 1162b is rotatably fixed relative to the mold break abutment surfaces 1184a, 1184b.

In the example illustrated, when the plate 1130 is in one of the advanced and retracted positions, the mold break first abutment surface 1184a and the mold break second abutment surface 1184b are spaced axially apart by a mold break first distance 1194a and axially locked relative to one another. When the plate 1130 is in the mold break position, the mold break first abutment surface 1184a and the mold break second abutment surface 1184b are spaced axially apart by a mold break second distance 1194b and axially locked relative to one another. The mold break second distance 1194b is less than the mold break first distance 1194a. The mold break first distance 1194a corresponds to the decompressed state of the mold break spring 1162b. The mold break second distance 1194b corresponds to the compressed state of the mold break spring 1162b.

Referring to FIG. 8b, closing of the mold during operation of the machine 100 pushes the plate 1130 from the advanced position toward the retracted position. Translation of the plate 1130 from the advanced position toward the retracted position pushes the spindle 1150 rearward and the advancement second abutment surface 1182b toward the advancement first abutment surface 1182a. The axial distance between the advancement first and second abutment surfaces 1182a, 1182b decreases, compressing (energizing) the advancement spring 1162a. When the plate 1130 reaches the retracted position, the plate back surface 1130b bears against the front abutment surface 1132a of the platen body 1120, at which point the advancement abutment surfaces 1182a, 1182b are axially locked relative to one another, and the advancement spring 1162a is in the compressed state. A clamp load can be applied across the closed mold when the plate is in the retracted position, and resin can be injected into the mold when sufficient clamp load has been applied.

Once injection is complete and the clamp load is relieved, the advancement spring 1162a can decompress. During decompression, the advancement spring 1162a pushes the advancement first abutment surface 1182a and the advancement second abutment surface 1182b axially apart. This pushes the platen body 1120 rearward relative to the plate 1130 (which remains stationary through abutment of the mold halves 104a, 106a). The platen body 1120 is pushed rearward until the rearward facing axial endface of the first bearing inner race 1158a engages the spindle engagement surface 1167, at which point further axial separation of the advancement first and advancement second abutment surfaces 1182a, 1182b is inhibited, the advancement spring 1162a is in the decompressed state, and the plate 1130 is in the advanced position.

In some cases, after injection is complete, the mold halves 104a, 106a may become frozen together, as a result of, for example, the geometry of the article being molded and/or thermal effects of the injection cycle. In such cases, a mold break force may be required to break open the mold after the clamp load is relieved. The mold break force can act on the tie bars 108 to forcefully urge the platen apparatus 1104 rearward relative to the stationary platen 106 and the plate 1130 (which may be stuck to the stationary platen 106 from the force freezing together the mold halves 104a, 106b) until the mold breaks open.

In the example illustrated, prior to exerting a mold opening force on the mold, the mold break force acting on the tie bars 108 pushes the platen body 1120 further rearward of the plate 1130. As the platen body 1120 is pushed rearward, the plate 1130 translates relative to the platen body 1120 from the advanced position toward the mold break position. The mold break second abutment surface 1184b is pushed rearward toward the mold break first abutment surface 1184a, decreasing the axial distance between the mold break abutment surfaces 1184a, 1184b, and compressing (energizing) the mold break spring 1162b. The platen body 1120 is pushed rearward until the catch surface 1174 affixed to the platen body 1120 engages the stop surface 1170 affixed to the spindle 1150, at which point the mold break first abutment surface 1184a is axially locked relative to the mold break second abutment surface 1184b, the mold break spring 1162b is in the compressed state, and the plate 1130 is in the mold break position.

When the plate 1130 is in the mold break position, the mold break force is transferred to the plate 1130 (and the mold half 104a mounted to the plate 1130) through engagement of the stop surface 1170 and the catch surface 1174 to forcefully urge apart the mold halves 104a, 106a. Once the transferred mold break force exceeds the force freezing together the mold halves 104a, 106a, the mold half 106a breaks away from the mold half 104a, and the mold break spring 1162b can decompress.

During decompression, the mold break spring 1162b pushes the mold break first abutment surface 1184a and the mold break second abutment surface 1184b axially apart. This pushes the spindle 1150 (and the plate 1130) rearward toward the platen body 1120. Decompression of the mold break spring 1162b pushes the spindle 1150 rearward until the rearward facing axial endface of the first bearing outer race 1158b engages the platen body engagement surface 1175, at which point further axial separation of the mold break abutment surfaces 1184a, 1184b is inhibited, the mold break spring is in the decompressed state, and the plate is in the advanced position.

Referring to FIG. 9a, when the plate is in the advanced position, the advancement clearance gap 1148 and the stop surface clearance gap 1172 are provided. The plate 1130 can rotate without having the plate back surface 1130b of the plate 1130 rub against the front abutment surface 1132a of the pocket 1132, and the spindle 1150 can rotate without having the stop surface 1170 affixed to the spindle 1150 rub against the catch surface 1174 affixed to the platen body 1120. During rotation of the plate 1130 and the spindle 1150, the advancement spring 1162a (which is captive between the advancement first abutment surface 1182a and the advancement second abutment surfaces 1182b) can also rotate, further reducing friction and wear on the components of the platen apparatus 1104.

Figure 11A:
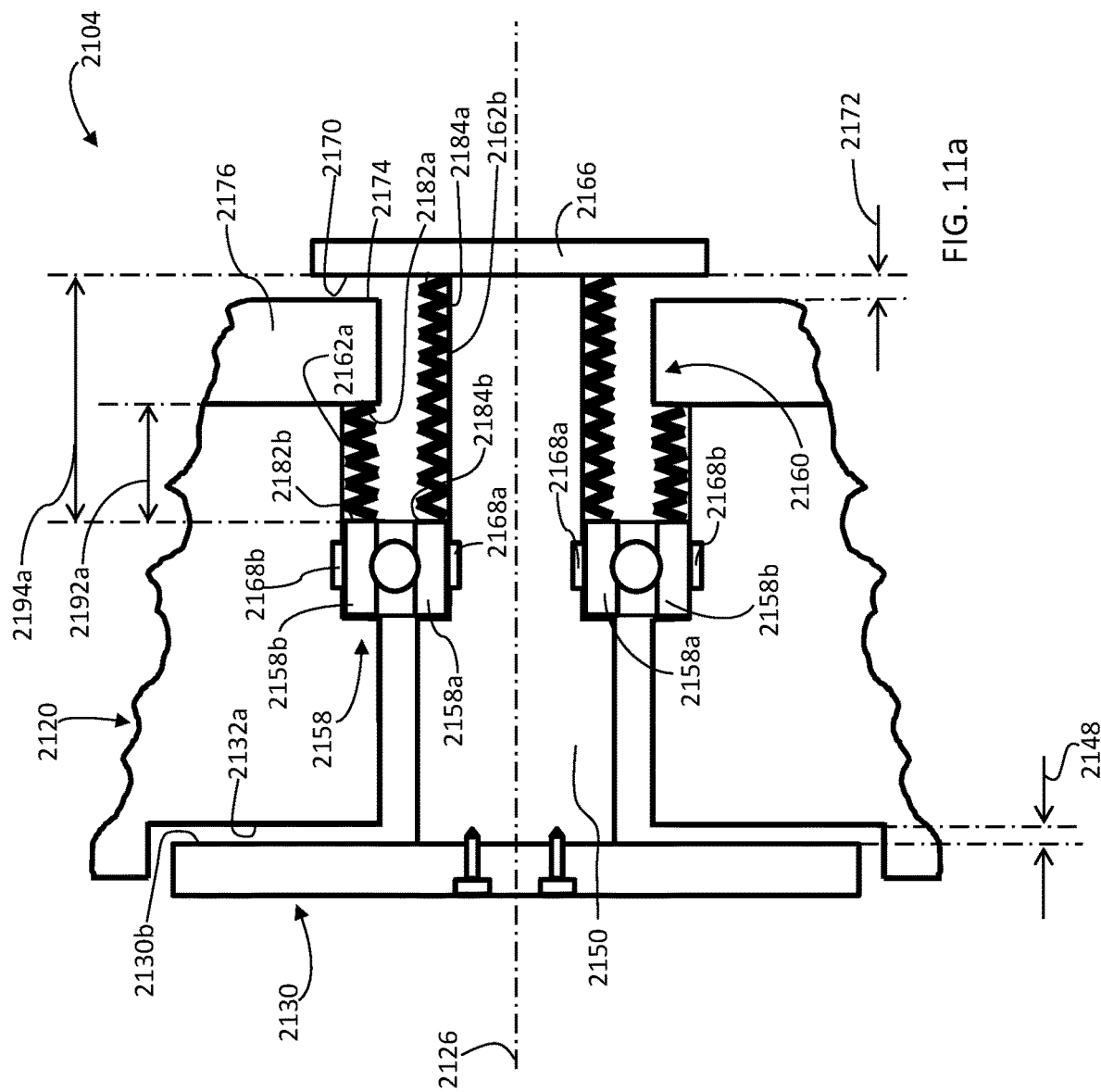
FIG. 11a is a schematic view of a portion of another platen apparatus for use with the injection molding machine of FIG. 1b, with a plate portion in an advanced position.

Referring to FIG. 11a, a simplified schematic view of another platen apparatus 2104 for use with the injection molding machine 100 is illustrated. The platen apparatus 2104 has similarities to the platen apparatus 1104, and like features are identified by like reference characters, incremented by 1000.

In the example illustrated, the platen apparatus 2104 includes a platen body 2120 and a plate 2130 rotatably mounted to the platen body 2120 for supporting a mold half. The platen apparatus 2104 further includes a spindle 2150 rotatably mounted in the platen body 2120, and the plate 2130 is affixed to the spindle 2150.

Figure 11B:
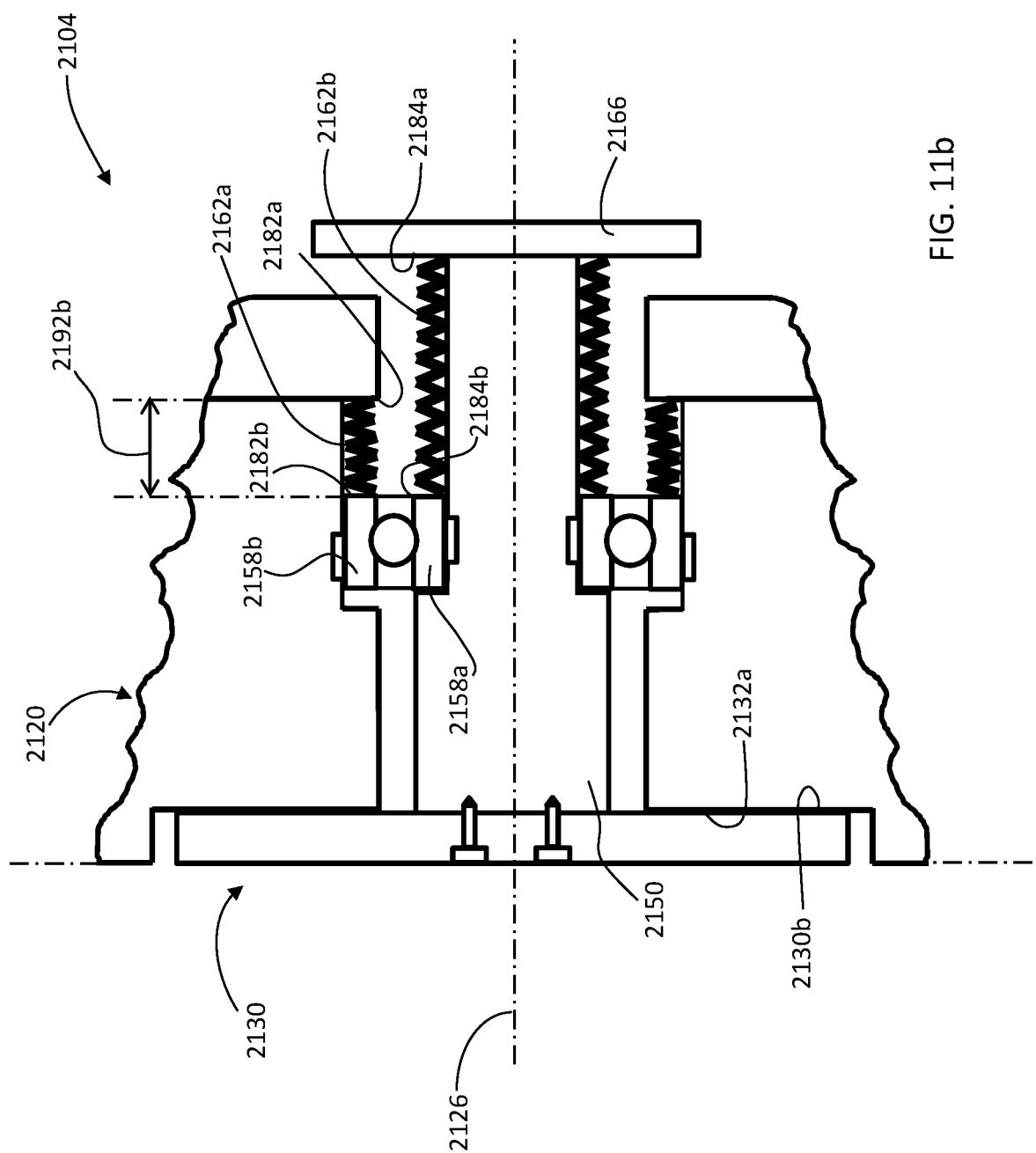
FIG. 11b is a simplified schematic view of the platen apparatus of FIG. 11a, with the plate portion in a retracted position.
Figure 11C:
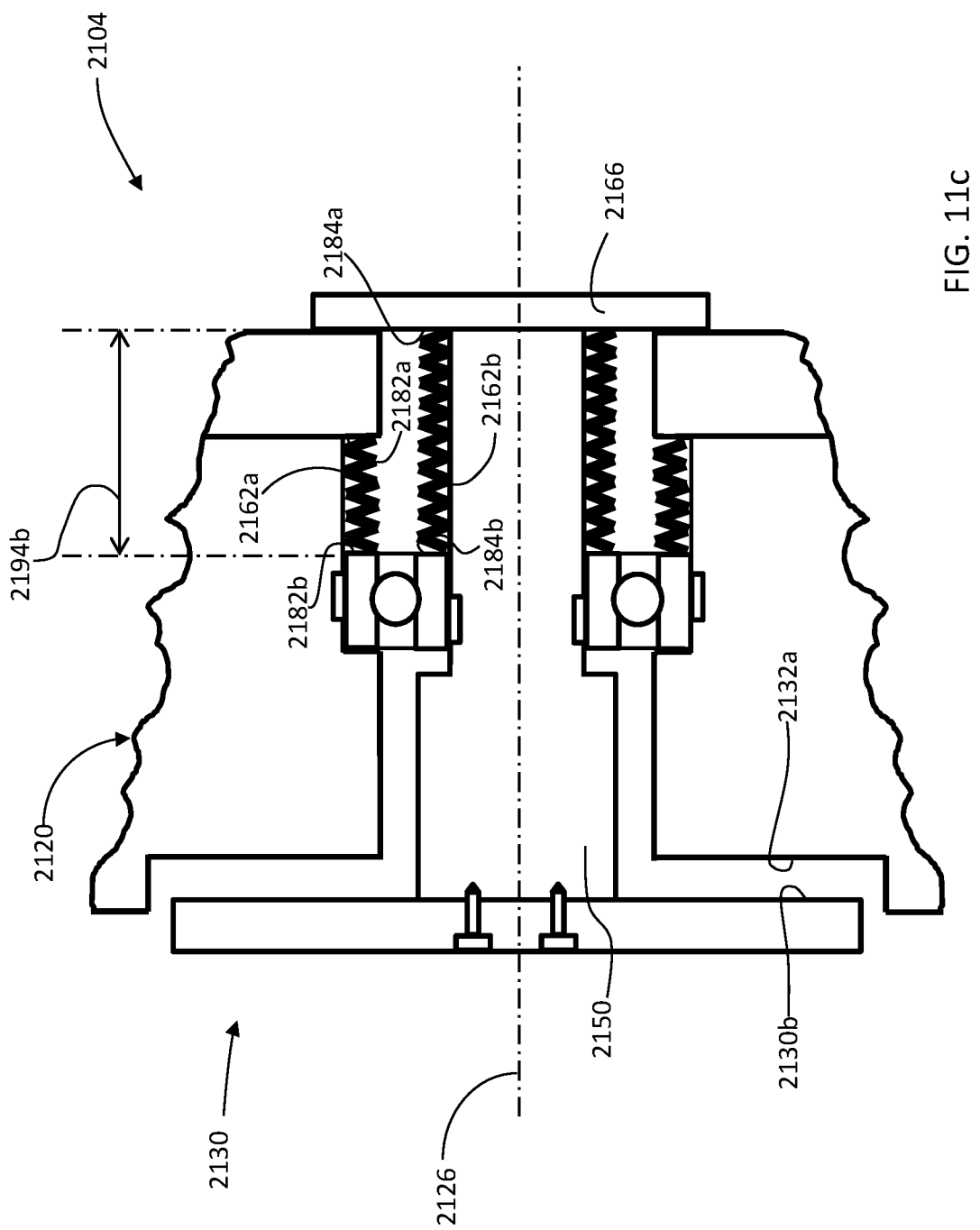
FIG. 11c is a simplified schematic view of the platen apparatus of FIG. 11a, with the plate portion in a mold break position.

The plate 2130 is rotatable relative to the platen body 2120 about an axis, and translatable relative to the platen body 2120 along the axis among a retracted position (FIG. 11b), a mold break position (FIG. 11c), and an advanced position (FIG. 11a) intermediate the mold break and retracted positions. In the example illustrated, the plate 2130 includes a plate back surface 2130b and the platen body 2120 includes a front abutment surface 2132a. The plate back surface 2130b bears against the front abutment surface 2132a when the plate 2130 is in the retracted position, and is spaced axially apart from the front abutment surface 2132a by an advancement clearance gap 2148 when the plate 2130 is in the advanced position.

The platen apparatus 2104 further includes a catch surface 2174 axially fixed to the platen body 2120 and in axial facing relation to a stop surface 2170 axially fixed to the spindle 2150. The stop surface 2170 is spaced axially apart from the catch surface 2174 by a stop surface clearance gap 2172 when the plate 2130 is in the advanced position, and bears against the catch surface 2174 when the plate 2130 is in the mold break position to limit axial separation of the plate 2130 and the platen body 2120.

In the example illustrated, the platen apparatus 2104 further includes a first bearing 2158 mounted about the spindle 2150 and rotatably supporting the spindle 2150 in the platen body 2120. The first bearing 2158 includes a first bearing outer race 2158b and a first bearing inner race 2158a in fixed axial alignment with the first bearing outer race 2158b. The first bearing inner race 2158a is rotatably fixed relative to the spindle 2150, and can rotate about the axis 2126 with the spindle 2150 during rotation of the plate 2130. The first bearing outer race 2158b is rotatably fixed relative to the platen body 2120.

In the example illustrated, during translation of the plate 2130 between the retracted and advanced positions the first bearing 2158 is axially locked relative to the spindle 2150 and axially translatable relative to the platen body 2120. The platen apparatus 2104 further includes an outer slide ring 2168b mounted radially between an outer surface of the first bearing outer race 2158b and an inner surface fixed relative to the platen body 2120 to facilitate axial translation of the first bearing 2158 relative to the platen body 2120.

In the example illustrated, during translation of the plate 2130 between the advanced and mold break positions, the first bearing 2158 is axially locked relative to the platen body 2120 and axially translatable relative to the spindle 2150. The platen apparatus 2104 further includes an inner slide ring 2168a mounted radially between an inner surface of the first bearing inner race 2158a and an outer surface of the spindle 2150 to facilitate axial translation of the first bearing 2158 relative to the spindle 2150.

In the example illustrated, the platen apparatus 2104 further includes a plate actuator 2160 biasing the plate 2130 toward the advanced position. The plate actuator 2160 includes an advancement spring 2162a for urging the plate 2130 from the retracted position to the advanced position.

In the example illustrated, the advancement spring 2162a is axially captive between an advancement first abutment surface 2182a and an advancement second abutment surface 2182b spaced axially apart from the advancement first abutment surface 2182a. During translation of the plate 2130 between the retracted and advanced positions, the advancement first abutment surface 2182a is axially locked relative to the platen body 2120 and the advancement second abutment surface 2182b is axially locked relative to the plate 2130. The advancement spring 2162a urges the advancement first abutment surface 2182a and the advancement second abutment surface 2182b axially apart to urge the plate 2130 from the retracted position to the advanced position.

In the example illustrated, the advancement first abutment surface 2182a and the advancement second abutment surface 2182b are rotatably fixed relative to one another. In the example illustrated, the advancement first abutment surface 2182a and the advancement second abutment surface 2182b are rotatably fixed relative to the platen body 2120, and do not rotate about the axis 2126 during rotation of the plate 2130. In the example illustrated, the advancement second abutment surface 2182b comprises a rearward facing axial endface of the first bearing outer race 2158b. The advancement first abutment surface 2182a comprises a forward facing surface of a collar 2176 (FIG. 11a) affixed to the platen body 2120.

In the example illustrated, when the plate 2130 is in the advanced position, the advancement first and advancement second abutment surfaces 2182a, 2182b are spaced axially apart by an advancement first distance 2192a and axially locked relative to one another. When the plate 2130 is in the retracted position, the advancement first and advancement second abutment surfaces 2182a, 2182b are spaced axially apart by an advancement second distance 2192b and axially locked relative to one another. The advancement second distance 2192b is less than the advancement first distance 2192a. Translation of the plate 2130 from the advanced position to the retracted position decreases the axial distance between the advancement first abutment surface 2182a and the advancement second abutment surface 2182b, compressing the advancement spring 2162a.

In the example illustrated, the plate actuator 2160 includes a mold break spring 2162b for urging the plate 2130 from the mold break position to the advanced position. In the example illustrated, the mold break spring 2162b is rotatably fixed relative to the plate 2130 (and the spindle 2150), and can rotate about the axis 2126 with the spindle 2150 during rotation of the plate 2130. In the example illustrated, the advancement and mold break springs 2162a, 2162b are generally annular and coaxial with the spindle 2150, and include respective central openings through which the spindle 2150 passes. The advancement spring 2162a has an inner diameter that is greater than an outer diameter of the mold break spring 2162b, and the advancement spring 2162a axially overlaps the mold break spring 2162b along a common length of the axis 2126.

In the example illustrated, the mold break spring 2162b is axially captive between a mold break first abutment surface 2184a and a mold break second abutment surface 2184b spaced axially apart from the mold break first abutment surface 2184a. During translation of the plate 2130 between the advanced and mold break positions, the mold break first abutment surface 2184a is axially locked relative to the plate 2130 and the mold break second abutment surface 2184b is axially locked relative to the platen body 2120. The mold break spring 2162b urges the mold break first abutment surface 2184a and the mold break second abutment surface 2184b axially apart to urge the plate 2130 from the mold break position to the advanced position.

In the example illustrated, the mold break abutment surfaces 2184a, 2184b are rotatably fixed relative to one another. The mold break first abutment surface 2184a and the mold break second abutment surface 2184b are rotatably fixed relative to the plate 2130 (and the spindle 1150), and can rotate about the axis 2126 with the spindle 2150 during rotation of the plate 2130. Rotation of one of the mold break abutment surfaces 2184a, 2184b about the axis 2126 rotates the other one of the advancement abutment surfaces 2184a, 2184b about the axis 2126.

In the example illustrated, the mold break second abutment surface 2184b comprises a rearward facing axial endface of the first bearing inner race 2158a. The mold break first abutment surface 2184a comprises a forward facing surface of a stop ring 2166 (FIG. 11a) fixed to the spindle 2150.

In the example illustrated, when the plate 2130 is in the advanced position, the mold break first and mold break second abutment surfaces 2184a, 2184b are spaced axially apart by a mold break first distance 2194a and axially locked relative to one another. When the plate 2130 is in the mold break position, the mold break first and mold break second abutment surfaces 2184a, 2184b are spaced axially apart by a mold break second distance 2194b and axially locked relative to one another. The mold break second distance 2194b is less than the mold break first distance 2194a. In the example illustrated, translation of the plate 2130 from the advanced position to the mold break position decreases the axial distance between the mold break first abutment surface 2184a and the mold break second abutment surface 2184b, compressing the mold break spring 2162b.

While the above description provides examples of one or more processes or apparatuses, it will be appreciated that other processes or apparatuses may be within the scope of the accompanying claims.

The invention claimed is:

1. A platen apparatus for supporting a mold portion in an injection molding machine, the apparatus comprising:
a) a platen body;
b) a plate rotatably mounted to the platen body for supporting a mold half, the plate rotatable relative to the platen body about an axis and translatable relative to the platen body along the axis between a retracted position and an advanced position;
c) an advancement spring axially captive between an advancement first abutment surface and an advancement second abutment surface spaced axially apart from and rotatably fixed relative to the advancement first abutment surface, the advancement first abutment surface axially locked relative to the platen body and the advancement second abutment surface axially locked relative to the plate during translation of the plate between the retracted and advanced positions, the advancement spring urging the advancement first abutment surface and the advancement second abutment surface axially apart to urge the plate from the retracted position to the advanced position; and
d) a spindle rotatably mounted in the platen body, the plate affixed to the spindle;
and wherein the advancement spring is generally annular and coaxial with the spindle, and includes a central opening through which the spindle passes.

2. The apparatus of claim 1, wherein translation of the plate from the advanced position to the retracted position decreases an axial distance between the advancement first abutment surface and the advancement second abutment surface, compressing the advancement spring.

3. The apparatus of claim 2, wherein when the plate is in the advanced position, the advancement first and advancement second abutment surfaces are spaced axially apart by an advancement first distance and axially locked relative to one another, and when the plate is in the retracted position, the advancement first and advancement second abutment surfaces are spaced axially apart by an advancement second distance and axially locked relative to one another, the advancement second distance less than the advancement first distance.

4. The apparatus of claim 1, wherein the advancement first abutment surface and the advancement second abutment surface are rotatably fixed relative to the plate.

5. The apparatus of claim 4 further comprising a first bearing mounted about the spindle and rotatably supporting the spindle in the platen body, the first bearing including a first bearing outer race and a first bearing inner race in fixed axial alignment with the first bearing outer race, the advancement first abutment surface comprising a forward facing axial endface of the first bearing inner race.

6. The apparatus of claim 5, wherein during translation of the plate between the retracted and advanced positions the first bearing is axially locked relative to the platen body and axially translatable relative to the spindle, the first bearing inner race rotatably fixed relative to the spindle and the first bearing outer race rotatably fixed relative to the platen body.

7. The apparatus of claim 6 further comprising an inner slide ring mounted radially between an inner surface of the first bearing inner race and an outer surface of the spindle to facilitate axial translation of the first bearing relative to the spindle.

8. The apparatus of claim 4 further comprising a second bearing mounted about the spindle and rotatably supporting the spindle in the platen body, the second bearing including a second bearing outer race fixed relative to the platen body and a second bearing inner race fixed relative to the spindle and axially translatable relative to the second bearing outer race, the advancement second abutment surface comprising a rearward facing axial endface of the second bearing inner race.

9. The apparatus of claim 1, wherein the advancement first abutment surface and the advancement second abutment surface are rotatably fixed relative to the platen body.

10. The apparatus of claim 9 further comprising a first bearing mounted about the spindle and rotatably supporting the spindle in the platen body, the first bearing including a first bearing outer race and a first bearing inner race in fixed axial alignment with the first bearing outer race, the advancement second abutment surface comprising a rearward facing axial endface of the first bearing outer race.

11. The apparatus of claim 10, wherein during translation of the plate between the retracted and advanced positions the first bearing is axially locked relative to the spindle and axially translatable relative to the platen body, the first bearing inner race rotatably fixed relative to the spindle and the first bearing outer race rotatably fixed relative to the platen body.

12. The apparatus of claim 11 further comprising an outer slide ring mounted radially between an outer surface of the first bearing outer race and an inner surface fixed relative to the platen body to facilitate axial translation of the first bearing relative to the platen body.

13. A platen apparatus for supporting a mold portion in an injection molding machine, the apparatus comprising:
   a) a platen body;
   b) a plate rotatably mounted to the platen body for supporting a mold half, the plate rotatable relative to the platen body about an axis, and translatable relative to the platen body along the axis among a retracted position, a mold break position, and an advanced position intermediate the mold break and retracted positions; and
   c) a plate actuator biasing the plate toward the advanced position, the plate actuator comprising a mold break spring urging the plate from the mold break position to the advanced position, and an advancement spring urging the plate from the retracted position to the advanced position.

14. The apparatus of claim 13, wherein the plate includes a plate back surface and the platen body includes a front abutment surface, the plate back surface bearing against the front abutment surface when the plate is in the retracted position, and spaced axially apart from the front abutment surface by an advancement clearance gap when the plate is in the advanced position.

15. The apparatus of claim 13 further comprising a spindle rotatably mounted in the platen body, the plate affixed to the spindle.

16. The apparatus of claim 15 further comprising a catch surface axially fixed to the platen body and in axial facing relation to a stop surface axially fixed to the spindle, the stop surface spaced axially apart from the catch surface by a stop surface clearance gap when the plate is in the advanced position, and bearing against the catch surface when the plate is in the mold break position to limit axial separation of the plate and the platen body.

17. The apparatus of claim 16, wherein the mold break spring is generally annular and coaxial with the spindle, and includes a central mold break spring opening through which the spindle passes.

18. The apparatus of claim 17, wherein the advancement spring is generally annular and coaxial with the spindle, and includes a central advancement spring opening through which the spindle passes.

19. The apparatus of claim 16, wherein the mold break spring is axially captive between a mold break first abutment surface and a mold break second abutment surface spaced axially apart from and rotatably fixed relative to the mold break first abutment surface, the mold break first abutment surface axially locked relative to the plate and the mold break second abutment surface axially locked relative to the platen body during translation of the plate between the advanced and mold break positions, the mold break spring urging the mold break first abutment surface and the mold break second abutment surface axially apart to urge the plate from the mold break position to the advanced position.

20. The apparatus of claim 19, wherein translation of the plate from the advanced position to the mold break position decreases an axial distance between the mold break first abutment surface and the mold break second abutment surface, compressing the mold break spring.

21. The apparatus of claim 20, wherein when the plate is in the advanced position, the mold break first and mold break second abutment surfaces are spaced axially apart by a mold break first distance and axially locked relative to one another, and when the plate is in the mold break position, the mold break first and mold break second abutment surfaces are spaced axially apart by a mold break second distance and axially locked relative to one another, the mold break second distance less than the mold break first distance.

22. The apparatus of claim 19, wherein the mold break first abutment surface and the mold break second abutment surface are rotatably fixed relative to the platen body.

23. The apparatus of claim 22 further comprising a first bearing mounted about the spindle and rotatably supporting the spindle in the platen body, the first bearing including a first bearing outer race and a first bearing inner race in fixed axial alignment with the first bearing outer race, the mold break first abutment surface comprising a forward facing axial endface of the first bearing outer race.

24. The apparatus of claim 18, wherein during translation of the plate between the advanced and mold break positions, the first bearing is axially locked relative to the spindle and axially translatable relative to the platen body, the first bearing inner race rotatably fixed relative to the spindle and the first bearing outer race rotatably fixed relative to the platen body.

25. The apparatus of claim 18 further comprising a second bearing mounted about the spindle and rotatably supporting the spindle in the platen body, the second bearing including a second bearing outer race fixed relative to the platen body and a second bearing inner race fixed relative to the spindle and axially translatable relative to the second bearing outer race, the mold break second abutment surface comprising a rearward facing axial endface of the second bearing outer race.

26. The apparatus of claim 19, wherein the mold break first abutment surface and the mold break second abutment surface are rotatably fixed relative to the plate.

27. The apparatus of claim 26 further comprising a first bearing mounted about the spindle and rotatably supporting the spindle in the platen body, the first bearing including a first bearing outer race and a first bearing inner race in fixed axial alignment with the first bearing outer race, the mold break second abutment surface comprising a rearward facing axial endface of the first bearing inner race.

28. The apparatus of claim 27, wherein during translation of the plate between the advanced and mold break positions, the first bearing is axially locked relative to the platen body and axially translatable relative to the spindle, the first bearing inner race rotatably fixed relative to the spindle and the first bearing outer race rotatably fixed relative to the platen body.

29. A platen apparatus for supporting a mold portion in an injection molding machine, the apparatus comprising:
   a) a platen body;
   b) a plate disposed at a front of the platen body,
      the plate having a plate front surface defining at least a central portion of a mold mounting face of the platen apparatus for supporting a mold half, and the plate having a plate back surface opposite the plate front surface and directed towards a front abutment surface of the platen body,
      the plate translatable relative to the platen body between retracted and advanced positions spaced apart along a platen axis, the plate back surface bearing against the front abutment surface when in the retracted position, and the plate back surface spaced apart from the front abutment surface by an advancement clearance gap when in the advanced position, and the plate rotatable relative to the platen body about the platen axis at least when in the advanced position;

c) an advancement spring axially captive between an advancement first abutment surface and an advancement second abutment surface spaced axially apart from and rotatably fixed relative to the advancement first abutment surface, the advancement first abutment surface axially locked relative to the platen body and the advancement second abutment surface axially locked relative to the plate during translation of the plate between the retracted and advanced positions, the advancement spring urging the advancement first abutment surface and the advancement second abutment surface axially apart to urge the plate from the retracted position to the advanced position; and d) a spindle rotatably mounted in the platen body, the plate affixed to the spindle, wherein the advancement spring is generally annular and coaxial with the spindle, and includes a central opening through which the spindle passes.

30. The apparatus of claim 29, wherein the advancement clearance gap has a size in a range of about 0.5 mm to about 4 mm.

31. The apparatus of claim 29, wherein the advancement first abutment surface and the advancement second abutment surface are rotationally fixed relative to the spindle, and wherein the advancement spring rotates about the platen axis with the spindle.

32. The apparatus of claim 29, wherein the plate is further translatable to a mold break position spaced axially apart from the advanced position, the advanced position axially intermediate the retracted position and the mold break position, wherein a stop surface axially fixed relative to the plate bears against a catch surface axially fixed relative to the platen body when the plate is in the mold break position to limit axial separation of the plate from the platen body when an opening force is exerted on the plate during separation of the mold halves after the injection cycle, the apparatus further comprising a mold break spring urging the plate from the mold break position to the advanced position to provide a mold break clearance gap between the stop surface and the catch surface when the plate is in the advanced position.

* * * * *